(12) United States Patent
Dilworth

(10) Patent No.: US 11,692,593 B2
(45) Date of Patent: Jul. 4, 2023

(54) COMPACT, STACKABLE FRICTION CLUTCH BASED TORQUE DISTRIBUTION DEVICE, SYSTEM, AND METHODS OF USE

(71) Applicant: Peter Dilworth, Everett, MA (US)

(72) Inventor: Peter Dilworth, Everett, MA (US)

( * ) Notice: Subject to any disclaimer, the term of this patent is extended or adjusted under 35 U.S.C. 154(b) by 0 days.

(21) Appl. No.: 17/990,882

(22) Filed: Nov. 21, 2022

(65) Prior Publication Data

US 2023/0160439 A1     May 25, 2023

Related U.S. Application Data

(60) Provisional application No. 63/281,895, filed on Nov. 22, 2021.

(51) Int. Cl.

| | |
|---|---|
| *F16D 13/12* | (2006.01) |
| *F16D 13/60* | (2006.01) |
| *F16D 13/06* | (2006.01) |
| *F16D 13/72* | (2006.01) |
| *F16D 13/08* | (2006.01) |
| *B25J 9/10* | (2006.01) |

(52) U.S. Cl.
CPC ............. *F16D 13/12* (2013.01); *B25J 9/104* (2013.01); *F16D 13/06* (2013.01); *F16D 13/08* (2013.01); *F16D 13/60* (2013.01); *F16D 13/72* (2013.01); *F16D 2500/1045* (2013.01); *F16D 2500/70408* (2013.01)

(58) Field of Classification Search
CPC .......... F16D 13/08; F16D 27/12; F16D 28/00; F16D 13/06; F16D 13/12; F16D 13/60; F16D 2500/1045; F16D 2500/70408; B25J 9/104; Y10T 74/20305; Y10T 74/20317; Y10T 74/20323; Y10S 901/21; Y10S 901/23
USPC .................................. 192/810, 12 BA, 84.81
See application file for complete search history.

(56) References Cited

U.S. PATENT DOCUMENTS

| | | | |
|---|---|---|---|
| 2,734,606 A | 4/1951 | Bellamy | |
| 2,574,714 A * | 11/1951 | Smith | ...................... F16D 13/08 192/81 C |
| 5,721,460 A | 2/1998 | Ushiro | |
| 2005/0230210 A1* | 10/2005 | Arnold | .................... F16D 27/025 192/21 |
| 2011/0126651 A1* | 6/2011 | Pan | ............................ B25J 9/104 74/89.2 |

FOREIGN PATENT DOCUMENTS

GB              173677 A *    1/1922           F16D 13/08

* cited by examiner

*Primary Examiner* — Richard M Lorence
(74) *Attorney, Agent, or Firm* — Patent Negotiator, PLLC; Sarita Pickett

(57) ABSTRACT

The present disclosure describes methods, systems, apparatuses, and devices for facilitating actuating robots and automatic machines. Specifically, the present invention provides a capstan actuator with composite control coil. Further, the disclosed system may allow for multi-jointed robots, or other multiple degrees of freedom machines, to be constructed in a novel manner that allows for a single prime mover to supply motive power to many other degrees of freedom with very good control fidelity.

15 Claims, 25 Drawing Sheets

COMPACT, STACKABLE FRICTION CLUTCH BASED TORQUE DISTRIBUTION DEVICE, SYSTEM, AND METHODS OF USE

This application claims benefit to a provisional application No. 63/281,895, filed on Nov. 22, 2021.

BACKGROUND OF THE INVENTION

1. Field of the Invention

The present invention relates generally to actuation for mechanical systems. More specifically, the present invention is methods, systems, apparatuses, and devices for facilitating the actuation of and distribution of power for mechanical systems such as automatic machines and robots using friction clutches.

2. Description of the Prior Art

U.S. Pat. No. 5,721,460 discloses a capstan motor having a capstan shaft, bearings, housing, with a stator yoke.

U.S. Pat. No. 6,155,511 discloses several capstan motors, including: a capstan motor having a coil fixing member which is used to attach a plurality of coils to a stator yoke.

SUMMARY OF THE INVENTION

Advantages and Differences of Invention Over Known Prior Art

The fields of machine automation and robotics are important to many industries, businesses organizations, and/or individuals. Existing techniques for facilitating the actuation of and distribution of power for automatic machines and robots using stackable, non-binding fiction clutches are deficient in several important aspects. For instance, prior art technologies do not allow a single prime mover to supply motive power to many other degrees of freedom in a compact, low mass, low-cost way with good control fidelity. Providing motive power to many different manipulators is referred to as one-to-many ability.

One-to-many capability is important because it facilitates replacing the large numbers of heavy expensive motors that would be needed at each degree of freedom in an automatic machine or robot with a single prime mover. This prime mover is the source of torque or power for all of the degrees of freedom in the machine. Since there is only a single prime mover, the cost and total mass of the machine is greatly reduced, making it more desirable since power can be distributed to where it is needed in an efficient manner.

One of the ways that the invention achieves this efficiency is through the use of a novel type of constricting coil friction clutch. This clutch is optimal for reduced cost, reduced mass, and reduced size in comparison to any existing technology. In addition to these advantages, the invention also allows for improved peak performance along certain control criteria such as speed of acceleration and dynamic performance when compared to previously existing actuation technology.

Further, previous technologies that use constricting coil style friction clutches have important limitations in comparison to the present invention. It can be demonstrated that there are problems with the previous technology which has tried to employ flexible material for the constricting coils with friction binding when there are more than about 5 wraps, or turns, in the coil about the capstan shaft. That is, unlike with a nautical capstan, where the number of coils are intended to increase, for a capstan friction clutch, the number of coils are constant.

However, since the power output of the friction clutch is exponentially proportional to the number of wraps of the constricting coil, a higher number of wraps was found to be desirable for many applications. In order to increase the usable number of wraps, without the problem of friction binding, it is desirable to use a rigid or semi rigid material so that each wrap has sufficient stiffness to be both pulled on and pushed upon by neighboring wraps in the coil. This ability to both pull and push prevents the problem of binding which occurs in coils made with a flexible material such as rope or string, having more than about 5 wraps or turns in the coil.

Additionally, the invention has an important novel feature which allows the stacking of a number of friction clutches made from semi rigid or rigid materials on a rotating power input tube (i.e., capstan, capstan tube, capstan shaft, input shaft) in a more compact space than otherwise. That is, previously, the amount of space required to provide a one-to-many ability would be prohibitive for most mechanical systems. For example, trying to use a similar previous method in an automobile would increase the size of the clutch system by 50 times.

This novel feature is that the width of each individual wrap in the constricting coil friction clutch varies with the thickness of some of the higher power wraps being thicker and some of the lower power wraps being thinner. Since the load is less on the wraps at the low power or input end of the coil, it is possible to make them thinner without losing the breaking strength that is necessary in the coil. This allows for relatively thin wraps at the lower force end of the coil and relatively thicker wraps at the higher force end of the coil. The peak forces seen by each wrap can be calculated using the capstan equation, below:

$$T_{load} = T_{hold} e^{\mu \phi}, \qquad (1)$$

where $T_{load}$ the applied tension on the line, $T_{hold}$ is the resulting force exerted at the other side of the capstan, $\mu$ is the coefficient of friction between the rope and capstan materials, and $\phi$ is the total angle swept by all turns of the rope, measured in radians with one full turn the angle $\phi = 2\pi$).

This allows for optimal use of the material in the coil and allows for the minimum overall size of the coil to be achieved. Because of the reduction in the total length of the coils, a greater number of constricting coil friction clutches can be stacked or combined in an efficient and compact manner than would otherwise be possible. This allows for the design of more practical automatic machines and robots than would be possible otherwise.

Furthermore, the invention uses a control servo (i.e., hobby servo, small motor) that is much smaller and lower mass than the prime mover to control the constricting coil friction clutches, with one small control servo per coil clutch or with one small control servo per meshed pair (meshed via gearing or other transmission) of coil clutches. Since the small control servos have lower mass, and therefore lower inertia than the equivalent conventional actuator would have, these small control servos also can be controlled with improved performance and improved control bandwidth as compared to prior art that does not use one-to-many style actuation.

Furthermore, it is an object of the present invention to provide a significant improvement in reduced cost and reduced mass in comparison to one-to-many style actuation systems found in the prior art. For example, the control servos in hydraulic one-to-many style actuation systems are complex mechanical devices that are very expensive to fabricate in comparison to the invention which uses low-cost simple plastic components that can be fabricated by injection molding or other low-cost methods. By combining the advantages of one-to-many control, low mass coil constricting friction clutches and rigid material in the coils along with varying width of individual wraps in each coil, the invention offers unique and important advantages over the prior art. Therefore, there is a need for improved methods, systems, apparatuses, and devices for facilitating the actuation and distribution of power in automatic machines and robots using constricting coil friction clutches made from rigid or semi rigid material with varying width of individual wraps in proportion to the forces in each wrap.

According to some embodiments, a system for facilitating actuating robots and automatic machines using capstan actuator with composite control coil is disclosed. Accordingly, the system may include a novel 3D printed (or injection molded) capstan coil (or coil) to transfer force from a capstan shaft via a control coil. Further, the system may include a small control servo configured to distribute the forces of a prime mover to a desired degree of freedom associated with an automatic machine (such as a robot).

Further, the system may include a rigid capstan coil that allows for better control at high loads because it eliminates the tendency for a rope coil to bind and grip the capstan tube (or shaft) even when the control servo tries to loosen the rope coil. Further, the system may include a dual spring stiffness series elastic element that allows for force control and a reduction in parasitic zero force friction.

Further, the system may include the prime mover (typically an electric motor) mechanically coupled with the capstan tube. Further, the prime mover may rotate the capstan tube. Further, the capstan tube may be made of a hard smooth material such as stainless steel. For each degree of freedom of the robot, the system may include control coils typically made of a stiff, long-wearing material, such as nylon. Further, the control coils may be augmented with a strong cord wrapped on the outside (non-friction bearing surface) in a composite manner to reduce stretching, that engage with the capstan tube.

Further, each control coil may include a control servo and a small servo that controls the input end of the control coil (or coil) and only requires very low forces. At the other end of the coil is the high force output that may be attached to a pull cable, gear, or other means of distributing the force to the joint of the robot. Further, the 3D printed nylon performs very well and allows the control coil to be loosened quickly by the control servo. By combining this control coil/capstan with a good force or position control at the output may be achieved.

Further, the system may include a dual stiffness (non-linear) spring in the series elastic actuator (SEA) to reduce the passive friction at low control forces. Further, a very weak spring is added to the mainspring of the SEA to sense low force/load conditions on the capstan and allow for the capstan coil to be loosened to reduce parasitic friction. Further, each output channel associated with the system may include a plastic coil that may be geared at one end to allow a small servo motor to engage that end of the coil for the control input. Further, a control cord may be attached to the friction clutch. Such attachment may be provided by wrapping and gluing along the outside of the plastic coil. The black external cord may lend strength to the coil and help prevent the nylon from stretching over time. Further, in some embodiment, the system may include multiple coils that may be stacked on one capstan tube.

The present invention achieves these and other objectives by providing a stackable arrangement of constricting coil friction clutches, under software control of output torque arranged on a rotating power input tube (capstan tube) that is powered by a Prime Mover, and that has constricting coil friction clutches that are made from a rigid or semi rigid material, or composite of materials, and that have wraps that have varying widths, so that the higher power (output) wraps have thicker widths, and the lower power (input) wraps have smaller widths, thus minimizing the overall size of the stack of wraps as compared with a stack without this feature. Each of the constricting coil friction clutches is controlled at the input by a small control servo or other means, and each constricting coil friction clutch has transmission, such as a Bowden cable or other means to redirect the torque or power produced by the coils to the degree of freedom or freedoms actuated by the coil. Any combination of degrees of freedom and coils applies.

The present invention is applicable for any system that uses constricting or expanding coil friction clutches. The present invention is applicable for any system that uses coils made with rigid or semi rigid materials that are arranged in any composite manner, include radial, axial or blended material composition. The present invention is applicable for any system that uses any style or means of generating small forces as the input to the constricting coil friction clutch The present invention is applicable for any system that uses a Bowden cable to transmit the output power from the constricting coil friction clutch to the degree or degrees of freedom to be controlled.

The present invention may employ the use of series elastic actuators (SEA) in combination with the constricting coil friction clutch. This includes systems where the SEA is integrated into the constricting coil friction clutch, and systems where the SEA is connected in series to the output transmission of the constricting coil friction clutch The present invention is applicable for any system that has one or more primary drives. Including systems that have more than one primary drive per rotating power input tube (capstan tube) or more than one power input tube per primary drive, or any combination thereof.

The present invention is applicable for any system that is configured with constricting coil friction clutches arranged in connected pairs, as in the torque amplifier or any system that has constricting coil friction clutches arranged independently, with each separate coil controlling one separate output transmission.

The present invention is applicable for any system that has ball joints or other multi axis degrees of freedom that are controlled or powered by the outputs of the constricting coil friction clutches. The present invention is applicable for any system that uses proportional, integral, derivative or other type of software control system to control the input signal of the constricting coil friction clutches The present invention is applicable for any system that uses any type of actuation or means of mechanical power input for the rotating power input tube (capstan tube). This could include electric motors, hydraulic motors, gas piston motors, gas turbine motors, chemical motors, compressed gas motors etc.

The present invention is applicable for any system that uses stainless steel, titanium, or other hard-wearing material such as metals, plastics, composites, etc, for the composition of the rotating power input tube (capstan tube)

The present invention is applicable for any system that uses nylon, PTFE, ABS, or any other plastic, or other rigid or semi rigid material or metal, or composite or friction lining material (friction brake material) for the composition of the constricting coil friction clutches. The present invention is applicable for any system that uses the invention to control in whole or in part, such as a bipedal, quadrupedal, or other type of robot. The present invention is applicable for any system that uses the invention to control in whole or in part any type of industrial machine or equipment.

The present invention is applicable for any system that uses active or passive thermal cooling technology, such as active or passive liquid cooling of the rotating input power tubes (capstan tubes) to reduce the heat due to friction in the interface of the constricting coil friction clutches with the rotating power input tube (capstan tube), and thus reduce wear, and thus increase useful lifespan. The present invention is applicable for any system that has a chord or other strong material wrapped around the outside of the rigid or semi rigid constricting coil friction clutch in order to increase the overall strength of the coil and prevent mechanical deformation of the coil under load.

The present invention is applicable for any system that is arranged so that the stackable constricting friction clutches made of rigid or semi rigid material with varying wrap width in each coil, such that the stackable sub assembly can be quickly and easily removed as a unit with minimal work so that the stackable unit can be quickly, cheaply, and easily replaced for routine maintenance. The present invention is applicable for any system that has strain gauges, thermal sensors, or other sensors embedded into the constricting coil friction clutches, or the rotating power input tube (capstan tube) in order to facilitate control of the coils or for monitoring heat in the system to optimize use and lifespan.

The present invention is applicable for any system that uses SMA as a material for the control of the constricting coil friction clutches. The present invention is applicable for any system that includes the use of lubricants or other additive materials at the interface of the constricting coil friction clutches and the rotating power input tube, in order to optimize friction properties, heat generation due to friction, or other advantage The present invention is applicable for any system that uses constricting coil friction clutches as the means of power input to the wheels of an automobile, and that uses the constricting coil friction clutches to distribute power to the wheels of the automobile. The present invention is applicable for any system that uses a mix of constricting coil friction clutches composed of different materials for different coils to optimize the use of each coil for its particular purpose. The present invention is applicable for any system that uses coils of different geometry or number of wraps on one or a set of rotating power input tubes (capstan tubes)

The present invention is applicable for any system that uses the invention in the application of automobiles or other transport vehicles, boats, aircraft, earth moving equipment, heavy construction equipment, package delivery, package sorting, military uses, medical robotics, elderly care home robots., dinosaur robots for museums, exploration and rescue, construction machines and robots, factory equipment and robots, farm equipment and robots, mining equipment and robots.

The present invention is applicable for any system that uses constricting coil friction clutches that are distributed such that each coil or some combination of coils are located proximal to the degrees of freedom to be controlled, as opposed to on a rotating power input tube. The present invention is applicable for underwater applications, space/aerospace applications, and prosthetics, including artificial limbs, gait assistance, exoskeletal applications, human power augmentation, human power amplification, etc. The present invention is applicable for any system that uses software to optimize the life span of the system by monitoring and modelling heat buildup due to friction in the coils, or wear in the coils.

The present invention meets these objectives and failures of the prior art by providing an automatic machine comprising a torque distribution system; and at least a first moveable part associated with a first degree of freedom; the torque distribution system having a large prime mover capable of providing rotating power. The torque distribution system may also have an input capstan tube being capable of being rotated by power provided by the prime mover. The torque distribution system may also have at least one coil friction clutch axially aligned with an axis of the common rotating power input capstan tube. The torque distribution system may also have at least one small control servo capable of generating small forces for providing input to the at least one coil friction clutch.

The torque distribution system may also have at least one mechanical transmission cable connected to the first moveable part associated with the first degree of freedom. The torque distribution system may also have a support frame for securing the large prime mover, the common rotating power input capstan tube, the at least one small control servo, and the at least on coil friction clutch within the automatic machine;

The automatic machine having a torque distribution system may have at least one coil friction clutch which may be capable of activating movement of the first moveable part along the associated first degree of freedom. The automatic machine having a torque distribution system may have at least one coil friction clutch which is a constricting coil friction clutch. The automatic machine having a torque distribution system may have at least one coil friction clutch which is an expanding coil friction clutch. The coil friction clutch may be made of rigid materials arranged in arranged in any composite manner, the rigid materials selected from the group consisting of radial, axial, and blended material composition.

The coil friction clutch may have a series elastic actuator for output transmission of the constricting coil friction clutch. The automatic machine having a torque distribution system may also have a second coil friction clutch, such that the first friction clutch and the second coil friction clutch are arranged in a connected pair. In this case, the first friction clutch and the second coil friction clutch may each separately control output transmission.

The first moveable part associated with the first degree of freedom may be a ball joint. The automatic machine may have a software control system capable of controlling an input signal of the at least one coil friction clutch; and the software control system may be a proportional, integral, or derivative system. The torque distribution system may be in electric motors, hydraulic motors, gas piston motors, gas turbine motors, chemical motors, compressed gas motors, etc. The input capstan tube can be made of many materials, such as metals, plastics, composites, stainless steel and titanium, and other similar structurally sound materials.

The automatic machine may have active or passive thermal cooling technology capable of effecting a thermal property of the capstan tubes to reduce the heat due to friction along an interface between the at least one coil friction clutch and the capstan tube.

The present invention also discloses a torque distribution system for automatic machines having first and second pluralities of moving parts respectively associated with respective first and second pluralities of degrees of freedom. The torque distribution system may have a large prime mover capable of providing rotating power. The torque distribution system may have a first input capstan tube capable of being rotated by the prime mover in a first direction. torque distribution system may have a second input capstan tube capable of being rotated by the prime mover in a second direction opposite the first direction. The torque distribution system may have a first plurality of coil friction clutches axially aligned with a first axis of the first input capstan tube.

The torque distribution system may have a second plurality of coil friction clutches axially aligned with a second axis of the second input capstan tube. The torque distribution system may have a first plurality of control servos, each capable of generating small forces for providing input to a respective one of each of the first plurality of coil friction clutches. The torque distribution system may have a second plurality of control servos, each respectively capable of generating small forces for providing input to a respective one of each of the second plurality of coil friction clutches.

The torque distribution system may have a first plurality of mechanical transmission cables, each respectively connected to a respective one of the first plurality of moving parts respectively associated with a respective one of the respective first plurality of degree of freedom.

The torque distribution system may have a second plurality of mechanical transmission cables, each respectively connected to a respective one of the second plurality of moving parts respectively associated with a respective one of the respective second plurality of degree of freedom. The torque distribution system may have a support frame for securing the large prime mover, the first and second input capstan tubes, the first and second pluralities of coil friction clutches, and the first and second plurality of control servos.

Each of the first plurality of coil friction clutches and each of the second plurality of coil friction clutches may be either a constricting coil friction clutch or an expanding coil friction clutch. Each of the first plurality of coil friction clutches and each of the second plurality of coil friction clutches may be made of rigid materials arranged in any composite manner consisting of radial, axial, and blended material composition.

The present invention also provides a coil friction clutch capable of removable installation within a torque distribution system of an automatic machine. The torque distribution system may have a support frame securing a prime mover supplying rotational power to a rotating input capstan tube having a first axis, a small control servo, and a mechanical transmission cable connected to a first moveable part associated with a first degree of freedom. The coil friction clutch may have an input end adjacent to the control servo, capable of receiving input from the control servo.

The coil friction clutch may have an output end opposite the input end, the output end capable of connecting with and transmitting output to the mechanical transmission cable. The coil friction clutch may have a columnar body connecting the input end and the output end, the columnar body having a center hollow aperture. The columnar body formed of a coil helically winding around the center hollow aperture in a series of layers. The center hollow aperture may be capable of being axially aligned with the first axis of the rotating input capstan tube. The input end may be capable of receiving small forces being generated by the small control servo.

The coil friction clutch may have a series of layers forming the columnar body having a first layer adjacent the input end, a last layer adjacent the output end, and at least one interim layer between the second layer and the next-to-last layer; wherein the coil helically winding to form the columnar body is gradually tapered, such that a width of the first layer is less than a width of the interim layer which is in turn less than a width of the last layer.

The coil friction clutch may have a coil helically winding to form the columnar body which is gradually tapered, such that the coil adjacent to the input end has an input width which is greater than an output width adjacent to the output end.

The coil friction clutch may have series of layers forming the columnar body having a connection input portion connecting the first layer to the input end, and a connection output portion connecting the last layer to the output end.

The coil friction clutch may have a tension strengthener formed of a cord wrapped helically around an outside of columnar body, the tension strengthener capable of increasing an overall strength of the columnar body and preventing mechanical deformation of the columnar body under torsional load.

DETAILED DESCRIPTION OF THE INVENTION

Preliminary Understanding

Figure 1:
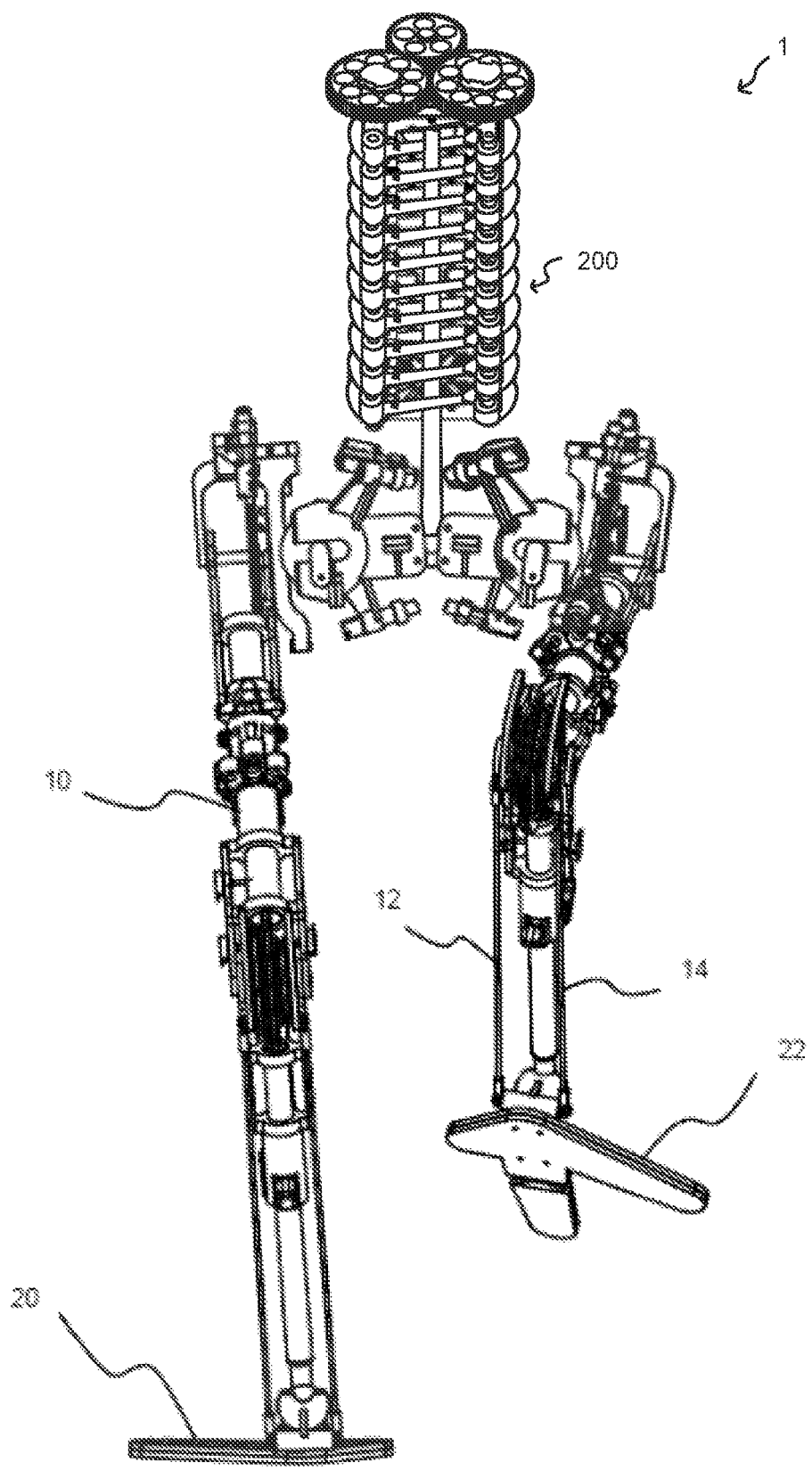
FIG. 1 is a front schematic view of one embodiment of the system according to the present invention shown facilitating the actuation of an automatic machines robot (the robot is walking away from the viewer).
Figure 2:
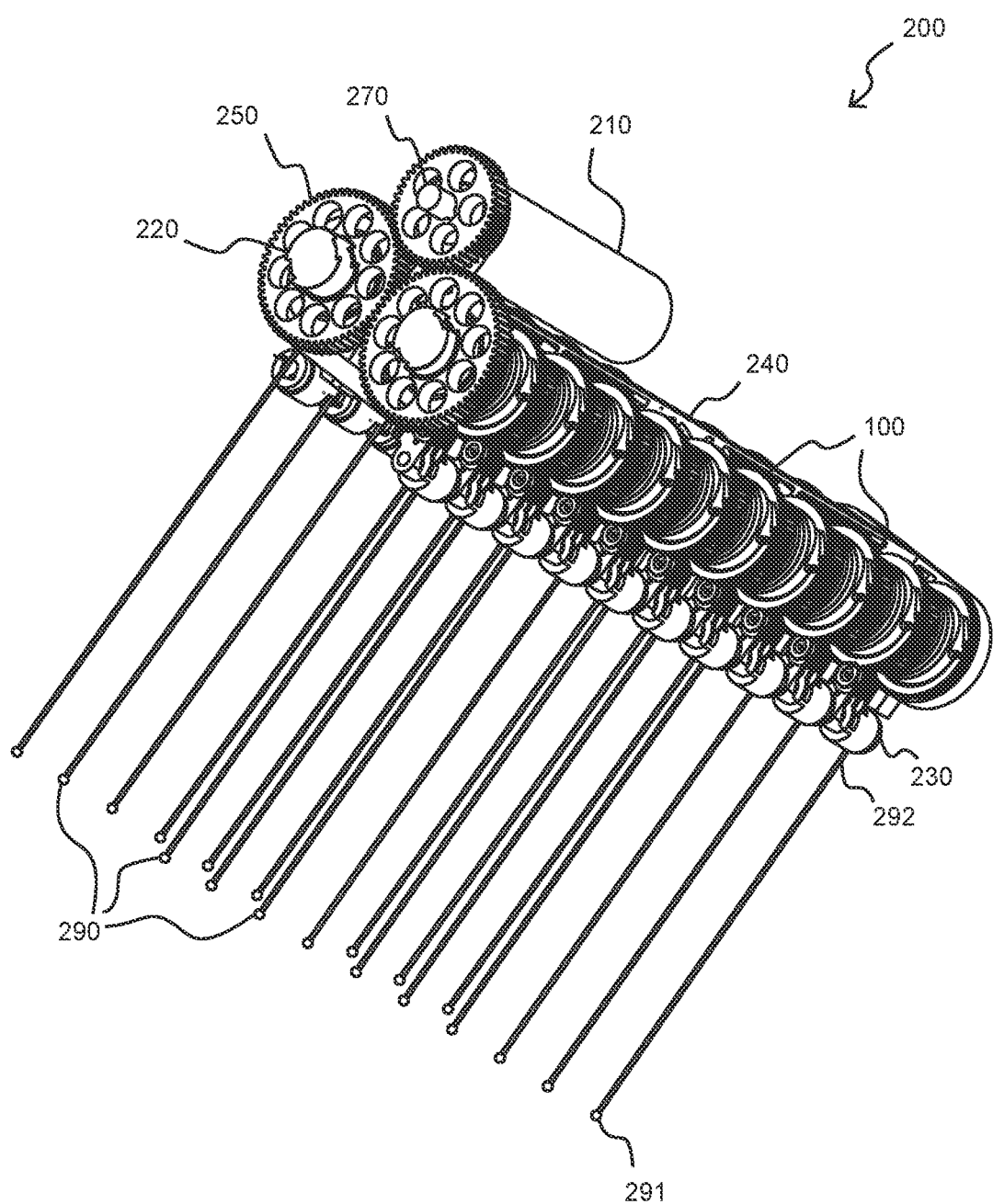
FIG. 2 is a side perspective view showing the capstan actuator assembly according to the present invention having stackable constricting coil friction clutches.

The accompanying drawings, which are incorporated in and constitute a part of this disclosure, illustrate various embodiments of the present disclosure. The drawings may contain representations of the various trademarks and copyrights owned by the applicant. In addition, the drawings may contain other marks owned by third parties and are being used for illustrative purposes only. All rights to various trademarks and copyrights represented herein, except those belonging to their respective owners, are vested in and the property of the applicant. The applicants retain and reserve all rights in their trademark and copyrights included herein, and grant permission to reproduce the material only in connection with reproduction of the granted patent and for no other purpose.

As a further preliminary matter, it will readily be understood by one having ordinary skill in the relevant art that the present disclosure has broad utility and application. As should be understood, any embodiment may incorporate only one or a plurality of the above disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure.

Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that these disclosures are illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof.

Furthermore, it is not intended that the scope of patent protection be defined by reading into any claim a limitation found herein that does not explicitly appear in the claim itself. Thus, for example, any sequence(s) and/or temporal order of steps of various processes or methods that are described herein are illustrative and not restrictive.

Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

It is intended that the scope of patent protection is to be defined by the issued claim(s) rather than the description set forth herein. Additionally, it is important to note that each term used herein refers to that which an ordinary artisan would understand such term to mean based on the contextual use of such term herein. To the extent that the meaning of a term used herein—as understood by the ordinary artisan based on the contextual use of such term within the present disclosure—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list." The following detailed description refers to the accompanying drawings.

While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header. The present disclosure includes many aspects and features. Moreover, while many aspects and features relate to, and are described in the context of methods, systems, apparatuses, and devices for facilitating actuating robots and automatic machines using capstan actuator with composite control coil, embodiments of the present disclosure are not limited to use only in this context.

List of Referenced Elements

Wherever possible, the same reference numbers are used in the drawings and the following description to refer to the same or similar elements. Accordingly, wherever possible, the following reference numbers are adhered to within the specification to refer to the corresponding referenced elements within the drawings of the present application.

| Reference Number | Term |
| --- | --- |
| 1 | robot |
| 10 | legs |
| 12 | first point of movement |
| 14 | second point of movement |
| 20 | feet |
| 22 | third point of movement |
| 30 | capstan tube frame first portion |
| 31 | capstan tube frame second portion |
| 32 | clockwise torque direction joint frame |
| 33 | joint frame second portion |
| 40 | first frame of joint |
| 42 | upper link of joint |
| 44 | output cable anchor point |
| 46 | Joint |
| 52 | stiff spring for main control of forces |
| 54 | small weak spring |
| 58 | potentiometer |
| 60 | non-linear spring |
| 100 | coil assembly |
| 103 | outer diameter |
| 104 | inner length of the coil |
| 105 | outer length of coil |
| 106 | whole body width |
| 107 | coil width |
| 108 | inner diameter |
| 109 | outer coil diameter |
| 110 | input end |
| 111 | input end of friction spiral |
| 112 | first cord wrap |
| 113 | alternate input end |
| 114 | interim cord wraps* |
| 115 | control strengthener cord |
| 116 | last cord wrap |
| 117 | trailing end of cord |
| 120 | layers |
| 121 | connection lead input end |
| 122 | transverse edge of input connection |
| 123 | connection input layer |
| 124 | width of input connection layer, right side |
| 126 | width of input connection layer, left side |
| 127 | width of first pitch, right side |
| 128 | first layer |
| 129 | width of first layer, right side |
| 130 | pitch (differs from layer to layer) |
| 131 | width of first layer, left side |
| 132 | width of second pitch, left side |
| 136 | interim layers |
| 137 | interim pitch |

-continued

| Reference Number | Term |
| --- | --- |
| 138 | width of interim layer |
| 140 | output connection layer |
| 141 | width of connection layer, right side |
| 142 | last layer |
| 143 | width of last layer, right side |
| 145 | last pitch |
| 146 | width of last layer, left side |
| 147 | width of output connection layer, right side |
| 150 | output end, pulley |
| 153 | width of output pulley |
| 156 | shoulder |
| 160 | mounting point for end of bowden drive cable |
| 161 | extrusion for stopper on exterior or output pulley to prevent unintended interaction with coil. |
| 162 | output cable end stop |
| 164 | hole for attachment point for bowden drive cable |
| 170 | integrated input gear for control servo |
| 200 | main array |
| 210 | prime mover |
| 212 | prime mover first end |
| 220 | capstan shaft |
| 221 | width of gap 222 between shaft and coil |
| 222 | gap between shaft and coil |
| 223 | diameter of capstan shaft |
| 224 | hollow core |
| 226 | diameter of hollow core |
| 230 | small motors, micro motors |
| 232 | micro servo frame second portion |
| 233 | micro servo electrical connections |
| 235 | Gearbox frame support |
| 237 | micro servo gear box |
| 238 | micro servo output gear mount |
| 239 | support for output gear of micro servo |
| 240 | frame |
| 241 | capstan frame assy primary drive end - end view |
| 242 | right lobe of frame end of capstan assembly |
| 243 | motor mount feature of end of capstan assembly |
| 244 | center fixture feature of capstan frame assembly |
| 245 | longitudinal extending portions of frame |
| 246 | frame apertures |
| 247 | prime mover attachment portion |
| 248 | frame base |
| 249 | end view of longitudinal stiffening element of capstan frame |
| 250 | prime mover gear |
| 251 | first gear for capstan shaft |
| 252 | second gear for second capstan shaft |
| 253 | gear teeth |
| 254 | gear apertures |
| 260 | output gear for servo |
| 270 | prime mover shaft |
| 290 | bowden cables |
| 291 | second end, near joint |
| 292 | first end, near coil |
| 293 | bowden cable sheath |
| 294 | bowden cable first direction |
| 295 | bowden cable reversed direction |

General Description of the Invention and Method of Use.

The present disclosure describes methods, systems, apparatuses, and devices for facilitating actuating robots and automatic machines using capstan actuator with composite control coil. Further, the disclosed system may allow for multi-jointed robots, or other multiple degrees of freedom machines, to be constructed in a novel manner that allows for a single prime mover to supply motive power to many other degrees of freedom with very good control fidelity (so-called "One to Many" control). Further, the disclosed system uses a novel 3D printed (or injection molded) capstan coil (or coil) to transfer force from a capstan shaft via the control coil, in conjunction with a small control servo, to distribute the forces of the prime mover to the desired degrees of freedom. The design is based on the physics of the capstan (such as used on a ship) along with a novel design for the capstan shaft and coil to allow for improved control over existing capstan systems.

Further, the disclosed system may include a rigid capstan coil, as opposed to a rope or other flexible coil material which is found in existing capstan style control designs. The rigid coil allows for better control at high loads because it eliminates the tendency for the rope coil to bind and grip the capstan tube even when the control servo tries to loosen the coil. The disclosed system includes a dual spring stiffness series elastic element that allows for force control and a reduction in parasitic zero force friction.

The invention allows for the design and construction of robots and other complex machines that are significantly cheaper to make and lighter in mass than current designs that tend to be bulky, heavy, and expensive because they generally have large motors located at every joint. Also, the disclosed system may have increased control bandwidth over existing design methods because the inertia of the small control servo in the capstan actuator is much less than that of the typical larger motor that a conventional design would use, thus improving control bandwidth over existing designs.

Further, the disclosed system consists of a prime mover (typically an electric motor) that rotates the capstan tube (typically made of a hard smooth material, such as stainless steel). For each degree of freedom of the robot, the system may include control coils typically made of a stiff, long-wearing material, such as nylon, augmented with a strong cord wrapped on the outside (non-friction bearing surface) in a composite manner to reduce stretching, that engages with the capstan tube. Further, in an embodiment, multiple coils can be stacked on one capstan tube. Each coil may include a control servo and a small servo that controls the input end of the coil and only requires very low forces.

At the other end of the coil is the high force output, in the same manner as a ship's capstan. That may be attached to a pull cable, gear, or other means of distributing the force to the joint of the robot. The main advantage of the disclosed system is the use of a ridged control coil, rather than a flexible one (such as a rope or string). Further, the 3D printed nylon performs very well and allows the control coil to be loosened quickly by the control servo, which solves a problem frequently encountered if one uses a rope or string (which tends to bind, preventing the control system from functioning properly). The control capstan tube may also be fixed relative to the frame of reference of the device and using the same control coil and servo may act as a high fidelity clutch.

By combining this control coil/capstan with a series elastic actuator (SEA) good force or position control at the output may be achieved. The disclosed system may include the use of a dual stiffness (non-linear) spring in the SEA in order to reduce the passive friction at low control forces (a very weak spring is added to the mainspring of the SEA to sense low force/load conditions on the capstan and allow for the capstan coil to be loosened to reduce parasitic friction). The dramatic reduction in mass and cost of this technique will be very useful for a wide variety of applications over existing designs.

The disclosed system consists of a novel configuration that allows actuation and control of the joints of complex robots and other machines with a number of unique advantages over existing systems. Further, the disclosed system allows the use of a single, or small number, of prime movers (typically an electric motor, but this could be any source of mechanical power in theory), to be distributed to an arbitrary number of degrees of freedom in a machine. The power may be sent to the various joints in a controlled, stable, smooth manner, using conventional PID control techniques.

This allows for mass, cost and complexity to be greatly reduced as compared to conventional robots and other machines (henceforth the term "robot" may mean both robots and other automation machines and tools with multiple degrees of freedom). Also, the control can be improved due to the lower reflected inertia of the transmission (see item 4). Further, each output channel associated with the disclosed system consists of a plastic coil, called the capstan control coil, that is geared at one end to allow a small servo motor to engage that end of the coil for the control input.

Further, an external cord is wrapped and glued along the outside of the plastic coil. The external cord is important as it lends strength to the coil and helps prevent the nylon from stretching over time. The nylon lakes most of the force however and also makes a very robust surface that has good long-term wear characteristics. Further, the coils are constructed in a hybrid or composite structure.

This allows for many more windings to be used, and therefore higher amounts of force to be transmitted through the coil, than would be possible with a rope, because beyond about 8 windings or so, a rope may start to bind and be uncontrollable since you would not be able to loosen it from the capstan when needed. The coils in the disclosed system have the equivalent of 12.5 windings, and they do not bind or cause any other control problems. The other end of the coil attaches to the joint to be controlled via a gear, pull the cable, or other mechanical means. Further, the disclosed system may use a rigid plastic (or other material) capstan coil, as opposed to a rope or string.

Further, the shape associated with the rigid plastic material may be a thick rigid material (not a rope or string) and may have thicker wraps at the power end and thinner ones at the control end with a rope thickness that may be the same as the whole length. Other instances of a controllable capstan (such as the Torque Amplifier) use rope or string, or other highly flexible cord. This works for a small number of wraps, but if there are more than about 6 or 7 wraps, the coil may tend to bind on the capstan tube, especially when an individual may be trying to release or loosen the coil that may cause the control system to fail. The more wraps there are in the coil, the higher the force amplification, as indicated by the capstan equation. By the novel use of rigid capstan coils (3d printed nylon in the case of the proof of concept prototype), a coil with 13 wraps has been constructed and allows for excellent control, and does not bind. This is because the rigid coil can be pushed away from the capstan and loosened, whereas it is not possible to "push" a rope or string, only to "pull" on it.

Further, the capstan coil works through the action of friction with the capstan tube, typically made of stainless steel, or some other stiff, long-wearing material. The disclosed system allows for the single prime mover to turn the capstan tube to allow power to go to the capstan coils in a similar way to a powered capstan winch on a sailboat. The disclosed system also allows for a single long capstan tube to control many rigid capstan coils at the same time, making for a compact low mass, low-cost design.

Further, each control servo typically consists of a very small low inertia electric motor along with a relatively low gear ratio gear head (although direct drive or other transmissions are also possible). The fact that this control servo has low inertia greatly reduces the reflected inertia of the output as compared to a conventional arrangement with a larger electric motor at each joint, with a much larger rotor mass. Therefore increased control bandwidth is possible (faster acceleration and deceleration is possible) as compared to conventional control systems. This control servo directly drives a gear that is molded into or attached to the input end of the capstan coil. This is possible because the capstan coil is rigid, and can therefore have torque applied to it through the gear in both a clockwise and counterclockwise (loosen and tighten) direction. The output end of the capstan coil may similarly include a gear to transmit power to the rest of the robot, or some other means of transmission (such as the use of a Bowden cable as in the case of the proof of concept prototype). Further, the cost of the plastic control coils is extremely low (they can be made from a single injection molded part), as compared to the costs of a conventional motor at every joint design, or in the case of hydraulics where the control valves and output pistons are much higher cost, thus drastically reducing the cost of the machine (by an estimated factor of 2 or 3 at least).

Further, the mass of the control coils and control servos is much less than the mass of conventional systems. Further, the disclosed system allows for good control of joint stiffness as well as position and torque. In conventional robots, the stiffness of the joint is usually not independently controllable, only the position and sometimes the torque. Further, each control coil acts like a single directional muscle, and as is the case in biomechanics, two opposing "muscles" can be isotonically loaded to independently control the true stiffness of the joint as well as force position, etc., in conjunction with a nonlinear spring in a Series Elastic Actuator, this can allow for the design of higher performance walking robots than with conventional systems. Nonlinearity is not required for the system to do basic force control.

Further, the disclosed system may include a second weak spring in the Series Elastic component, so that at very low forces only the very weak spring is compressed, which allows for very low forces to be controlled in the capstan coil. The allows for lower losses in the capstan coils to occur when the desired force is zero, which will make the overall system use less power than would be the case if only the main stiffer spring was used in the Series Elastic Element. This is a form of non-linear spring, but in this case, the non-linearity is not continuous and is optimized specifically for low friction/low power from the coils when the desired force is around zero.

This secondary type of nonlinearity can result from the combination of two otherwise linear springs in the series elastic element (one weak spring for zero-force control) and one stiffer one for the regular control. The main issue being addressed here is that at zero force, a very slight amount of tension on the bowden cables may be desirable so they do not become loose and floppy, yet that small force needs to be as low as possible so that excessive load is not caused on the prime mover to maintain this "muscle tone"

Further, the disclosed system allows for easy high bandwidth control of the joint as a damper, by swapping the prime mover for a one-way ball bearing, using the same servo control hardware, etc., the disclosed system can control the damping of a joint with high bandwidth, velocity, and power to mass ratios. This is typically very difficult to implement with existing designs. But the disclosed system allows for this control at the same low cost, low mass, etc. as the other types of control. This may be very important to allow the construction of walking robots with higher performance and efficiency than with existing systems. Further, in some embodiments, the capstan control coils (or control coils) may be made with plastic, metal, or other composite materials.

Further, the 3D printed nylon wrapped with an external flexible cord may help to increase strength. The design of the control coils also embodies a design where the thickness of the high-power end of the coils is much greater than the low power end, thus allowing for a more compact design than a coil without this feature. Further, the thickness of each wrap of the coil increases in thickness as each wrap has more force applied to it. Further, the wraps at the end where the small input servo connects may be relatively thinner and the wraps at the end where the high force output may be relatively thicker.

Further, this is because as the force increases (according to the Capstan Equation), the breaking force at each wrap increases from wrap to wrap from the low force end to the high force end. Further, by making the low power end coils thinner, the total overall length of the coil may be greatly minimized as compared to a coil where all of the wraps are the same thickness as the highest power wrap. Further, this is critical for practical applications of the capstan actuator in multiple degrees of freedom systems because the overall volume occupied by the set of coils may be greatly reduced since each individual coil has a smaller overall length.

This may cause a reduction in a size, mass, and cost of the disclosed system that also allows for improvement in overall utility. Further, the disclosed system allows for a simple direct way to implement Series Elastic Actuators (SEA's) and Series Elastic Dampers (SED's) in combination with the rigid capstan coils. Further, the disclosed system includes potential future work, such as active or passive cooling (air, forced water, etc.) of the capstan tubes to allow for higher loads on the capstan coils, or other means of doing the servo control (SMA wire instead of motors, etc.).

Further, the control capstans may also be arranged in a unique geared pair that allows for a standard bi-directional control like the device known as a "torque amplifier". The arrangement of single long capstan tubes with multiple control coils on them is enabled by the unique geared arrangement of the disclosed system. this differs from the design of the torque amplifier which does not allow for efficient stacking of multiple degrees of freedom powered by a single prime mover, as discussed below. Further, the disclosed system enables the use of simple low-cost multi-axis joints in robots (such as plastic ball joints, etc.,) in a way not possible with existing technology, since control cable length is not constrained to be constant.

This means one can use n control coils to control n−1 axis joints. This reduces the complexity and simplifies the design of robots over existing technology and allows for more biologically inspired robots to be constructed. This is because with single-ended control cables (single coils acting "pull only" mode) the total length of the control cables is not constrained to be constant (as you would need with bidirectional cables that go around pulleys of fixed diameter).

By using single-direction coils, only three coils are needed to control a two-degree of freedom ball joint (since three points define a plane). Further, the disclosed system allows for the easy modular design of joints with more than one style of control, such as a knee joint in a walking robot that has both active actuation (with a SEA) and active damping (with a SED) in the same mechanical joint.

Capstan Coils

In summary, the invention consists of a prime mover which rotates a capstan tube, around which are a number of capstan coils, each controlled by a micro servo, with a power distribution system, such as a Bowden cable to each degree of freedom in a machine or robot.

A critical and novel feature of the invention is the way the wraps of the capstan coils are designed. There are examples of capstan coil friction clutch based machines, however all of these examples use coils where the width of the individual wraps in the coil are the same. The invention makes it possible for multiple coils to be stacked onto a capstan tube in a more compact way than would be possible without the novel feature of the invention. The novel feature is to design the width of the individual wraps in a coil such that no wrap is too thin to handle the breaking strength of the forces applied to it (as governed by the capstan equation). This means that the coil wraps can differ in width, in a manner to reduce the overall volume of the coil in comparison to a coil where all of the wraps have the same thickness.

All existing capstan coil friction clutches fall into two design categories. The first are designs that use rope, string, or some other relatively flexible material. These are easy to design, and are like past designs, including capstans found on ships and other historical applications. The second are coils that are made of a rigid, semi-rigid, or otherwise solid material, such as metal or plastic, but that are designed such that the wraps are all about the same width, also none of the existing applications have multiple coils arranged on a rotating capstan tube.

In the first case, the case using rope or string, it can be found experimentally that if a capstan coil friction clutch has more than about 6 or 7 wraps, control of the coil becomes impossible, because the coil cannot be loosened once it is pulled tight around the capstan due to binding. This is an important limitation because since the output power amplification of the coil is dependent on the number of wraps (as governed by the Capstan Equation), the maximum output power of such a system is limited relative to systems with a greater number of wraps. For many practical industrial applications, the utility of the system improves as the amount of output power amplification increases, therefore it is desirable to make coils with a higher number of wraps.

In the second case, coils made from a solid material have wraps of identical widths, since they are used as single coil systems, minimization of volume per coil is not as important as is the case in a machine or robot with many degrees of freedom and the design and manufacturing process is generally simpler if all of the wraps have the same width.

Since the forces on each wrap of a capstan coil friction clutch are governed by the capstan equation, it can be shown that the force increases exponentially from the low power input wrap to the highest power output wrap. The invention uses this fact in an innovative way to reduce the overall volume of the coil, which is desirable, since compactness of design is desirable.

In the invention, the wraps are designed so that each wrap is strong enough to withstand the forces as governed by the capstan equation, which means that the lower force wraps (those nearer the lower power end of the coil) can be thinner relative to the wraps at the higher power end (output end) of the coil. This novel feature allows the coil to be significantly smaller in size than without this feature. The advantage increases as the number of wraps in the coil increases. With coils with 12 wraps a volume and mass reduction of a factor or 3 or more is achieved in practical designs, as compared to designs with solid material coils without this feature, i.e in coils where all the wraps have the same width.

The present invention is a method to minimize the length of a stacked assembly of capstan friction control coils, stacked on a rotating capstan tube, by means of varying the width of the individual wraps of the coils.

In a stacked configuration, it is useful to minimize the total length of a stacked set of capstan friction coils stacked on a rotating capstan tube, since many applications favor compactness.

The capstan equation sets the maximum breaking force applied to each wrap of the capstan coil in an application. By varying the width of the wraps such that no wrap has a lower breaking strength (times a typical safety factor), than the forces on that wrap as governed by the capstan equation, it is possible to optimize a given design for a particular application to have minimum overall volume. This optimization is important because many real-world applications benefit from compactness of design, and because overall cost can be minimized with less materials.

Further discussions of the present invention employed in practical applications are described within: Peter Dilworth et al., "Walker Supported Leg Actuation Utilizing Capstan Coil Based One-To-Many System", Wearable Technologies (2022), (anticipated publication date of Dec. 10, 2022), which, upon its publication, is hereby incorporated by reference in its entirety.

FIG. 1—Automatic Machines & Robots Actuation

The preferred embodiment of the present invention is illustrated in FIGS. 1-32. FIG. 1 shows an automatic robot 1 having a system 200 with stackable coil friction clutches 100 which facilitates the actuation and movement of legs 10 and feet 20. More details of the system 200 and friction clutches 100 of this and other embodiments according to the present invention are shown in FIGS. 2-32.

Each stackable constricting coil friction clutches 100 with features such as composite construction, fabrication from rigid or semi rigid material, and varying width of individual wraps 120 to optimize the overall size 107 of the coil 100 to allow for compact system 120 design. Specifically, FIG. 1 shows the main components of the capstan actuator system 200 of the present invention being employed to activate movement of legs 10 and feet 20 through at least first, second, and third degrees of freedom moveable components 12, 14, 22. Not shown within FIG. 1 to provide further clarity are bowden cables 290 and the exterior housing which encompasses the whole machine and prevents the bowden cables 290 from becoming entangled or otherwise jostled during operation. Likewise, it is also to be understood that other means are typically provided for providing enhanced software control, such the computer controller, sensors, and appropriate electronic interface capable of connecting the robot arm, end effector, and servo drives, these are also not shown but are incorporated by reference according to the common understanding.

As discussed before, the present invention is a novel method to design and power complex multi degree of freedom machines 1, such as industrial machines and robots, in a way that is improved as compared to existing methods. The invention enables the design of complex multi degree freedom machines and robots that are lower cost, more compact, and lower in mass than with existing methods and technologies.

All complex multiple degree-of-freedom machines and robots fall into one of two main categories as far as the way power distribution is done. These two categories are called one-to-many (OTM), or many-to-many (MTM) power distribution. In OTM systems there are one or more main sources of power called a prime mover 210. The prime mover 210 generates all of the power for the machine or robot 1, and that power is then distributed as needed to the various degrees of freedom that require power. A MTM system is designed with a power system at each degree of freedom, so there are as many power sources as there are degrees of freedom.

Most existing examples of OTM systems use some form of hydraulics in order to distribute power. This requires a high-pressure pump, reservoirs, proportional hydraulic servo valves, and various hydraulic distribution lines with high pressure seals. These systems work well for large outdoor applications, such as earth moving equipment and construction machines, but are not suitable for smaller indoor applications due to the bulky nature of the components in them, the high cost of the servo vales, and pumps and other parts, and the danger of high-pressure oil leaks.

The advantages of an OTM system, are that for a given degree of freedom, most of the mass and cost are in the prime mover 210, and as each new degree of freedom is added, only the relatively smaller cost, mass and size of the control servo valves and connecting lines need to be added, so the machine scales with a fractional increase in mass cost and size as more degrees of freedom are added. This is a favorable result with regard to typical manufacturing, and marketing constraints.

Most existing examples of MTM systems use an electric motor that can supply the maximum power that might be required for a given degree of freedom. Since every degree of freedom in a machine, or joint on a robot, would have to have a relatively bulky, heavy, and expensive motor (typically an electric brushed or brushless DC motor) the cost and weight scales linearly with the number of degrees of freedom in the machine or robot. An advantage of MTM systems is the relative simplicity of their design, as they do not require the complex transmissions, and costly control servos and high-pressure power distribution lines that typical OMT designs have.

The invention overcomes the main problems that prevent existing OTM systems, such as hydraulics or pneumatics from being practical for indoor environments, such as in a typical home or factory, while maintaining the main advantages of OTM systems. Also, the invention maintains the relative simplicity of existing MTM designs that use electric motors, because the invention also uses electric motors and other simple transmission components typically found in MTM systems.

In this embodiment, the robot itself is fully automated by the capstan actuator assembly system shown in FIGS. 2-8. That is, a robot having a width of 355 mm(14 inches), a height of 1,117mm (44 inches), and a weight of 6.8 kg (15 lbs), made of aluminum, plastic, carbon fiber is fully moveable along 20 points of freedom with only a single prime mover 210.

FIGS. 2-8—Main Capstan Actuator Assembly System

FIGS. 2-8 shows a closer view of the capstan actuator assembly system 200 which makes this possible. The system mainly consists of a prime mover 210, two capstan tubes 220, each having a stack of coil friction clutches 100 supported on a frame 240. Each coil friction clutch 100 has an associated input servo 230 and mechanical transmission 290 (bowden cables not shown to scale). The prime mover 210 supplies power to each stack of capstan coil friction clutches 100 aligned along two rotating input tubes (capstan tubes) 220 via the prime mover gear 250 and shaft 270.

In this way, the power from the capstan tubes 220 are then distributed in a one-to-many system to multiple degrees of freedom 12, 14, 22 in an automatic machine or robot 1 via the series of stacked constricting coil friction clutches 100. Mechanical transmission is provided along Bowden cables 290 from a first end 292 adjacent the coils 100 to a second end 291 which is connected to legs 10 and feet 20 through at least first, second, and third points of movement 12, 14, 22.

Figure 3:
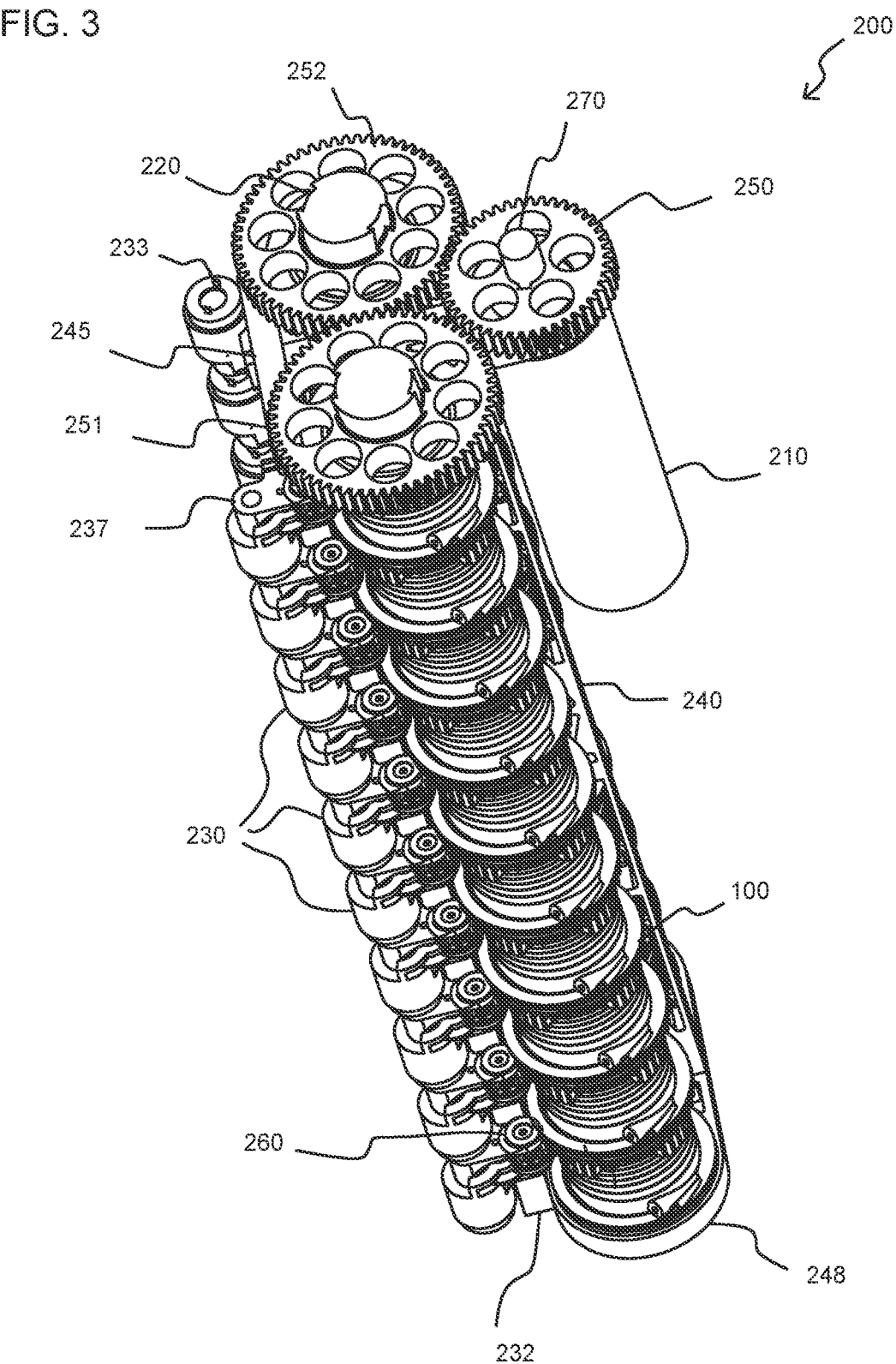
FIG. 3 is an enlarged side perspective view showing the capstan actuator assembly according to the present invention as shown in FIG. 2.
Figure 4:
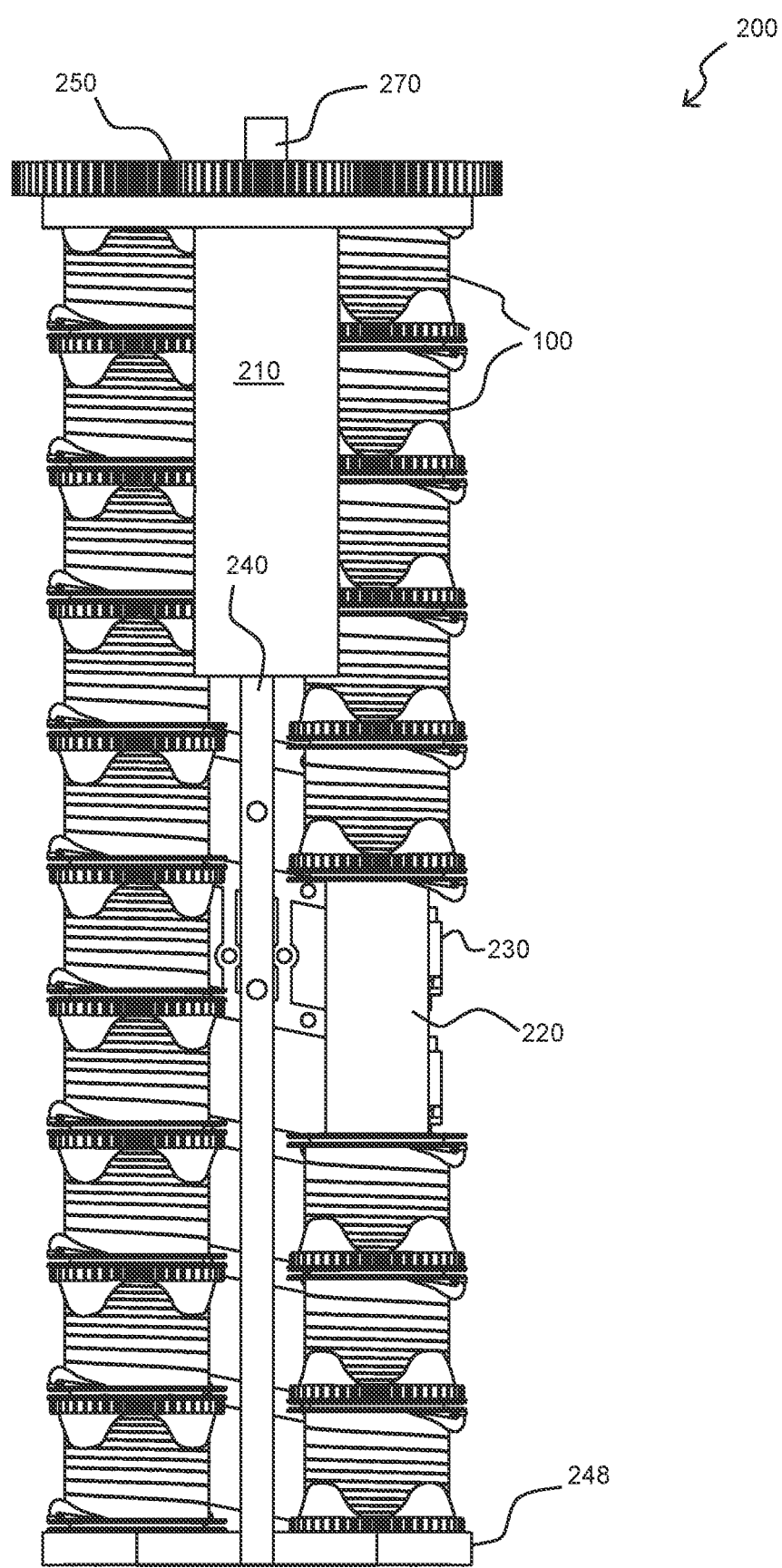
FIG. 4 is a top planar view showing the capstan actuator assembly according to the present invention as shown in FIG. 2.

FIG. 3 provides a few more details of this system 200. As shown in this figure, the coil clutches 100 of this embodiment are made from a rigid or semi rigid material. The width 124, 126, 127, 138, 141, 143 of the individual layers 120 of the clutch vary in order to maximize torque while yet minimizing the overall width 107 of the stacked constricting coil friction clutches 100, to allow for an overall compact form factor. The constricting coil friction clutches 100 shown here are high gain mechanical amplifiers. Specifically, these clutches 100 amplify the torque of a respective low power input servo 230 to a respective high power output torque that can be distributed using a pull cable or other style of mechanical transmission 290 to activate a degree of freedom 12, 14, 22 in an automatic machine or robot 1.

An example of a prime mover suitable for meeting the requirements of this embodiment of the invention is the Maxon DC brushed gear motor, RE40 model number 223284, the specifications of which are hereby incorporated by reference. The prime mover may be a typical prime mover having a width of 130 mm (5.11 inches), a height of 130 mm (5.11 inches), a length of 400 mm (15.7 inches), and a weight of 1.5 kg (3.3 lbs) capable of providing power of 53 NM.

The amount of torque or power seen at the output of the constricting coil friction clutch capstan coil 100 is equal to the total gain given by the capstan equation multiplied by the torque or power of the low power input servo 230. The maximum velocity of the coil high power output is equal to the velocity of the rotating input power tube (capstan tube) 220 which is connected to the prime mover 210. The maximum output torque of the coil high power output is equal to the maximum torque that the prime mover 210 can supply.

The low power input servo may be a typical small hobby servo having a typical width of 17 mm (0.67 inches), length of 22 mm (0.866 inches) diameter of 17 mm (0.67 inches) with a weight of 0.02 kg (0.044lbs) capable of providing power of 2.6 NM. Suitable servos 230 for meeting the objectives of the present invention will have electrical connections 233, micro servo frame part 232, frame support 235 for the micro servo gearbox 237, and micro servo output gear mount 238, most components of which are at least partially encased in housing 239. Electrical wires which connect to the electrical connections 233 for providing instruction are not shown, but are generally as understood in the art. An example of a hobby servo suitable for meeting the requirements of this embodiment of the invention is the DS Servo 35 kg coreless digital servo, the specifications of which are hereby incorporated by reference.

Figure 5:
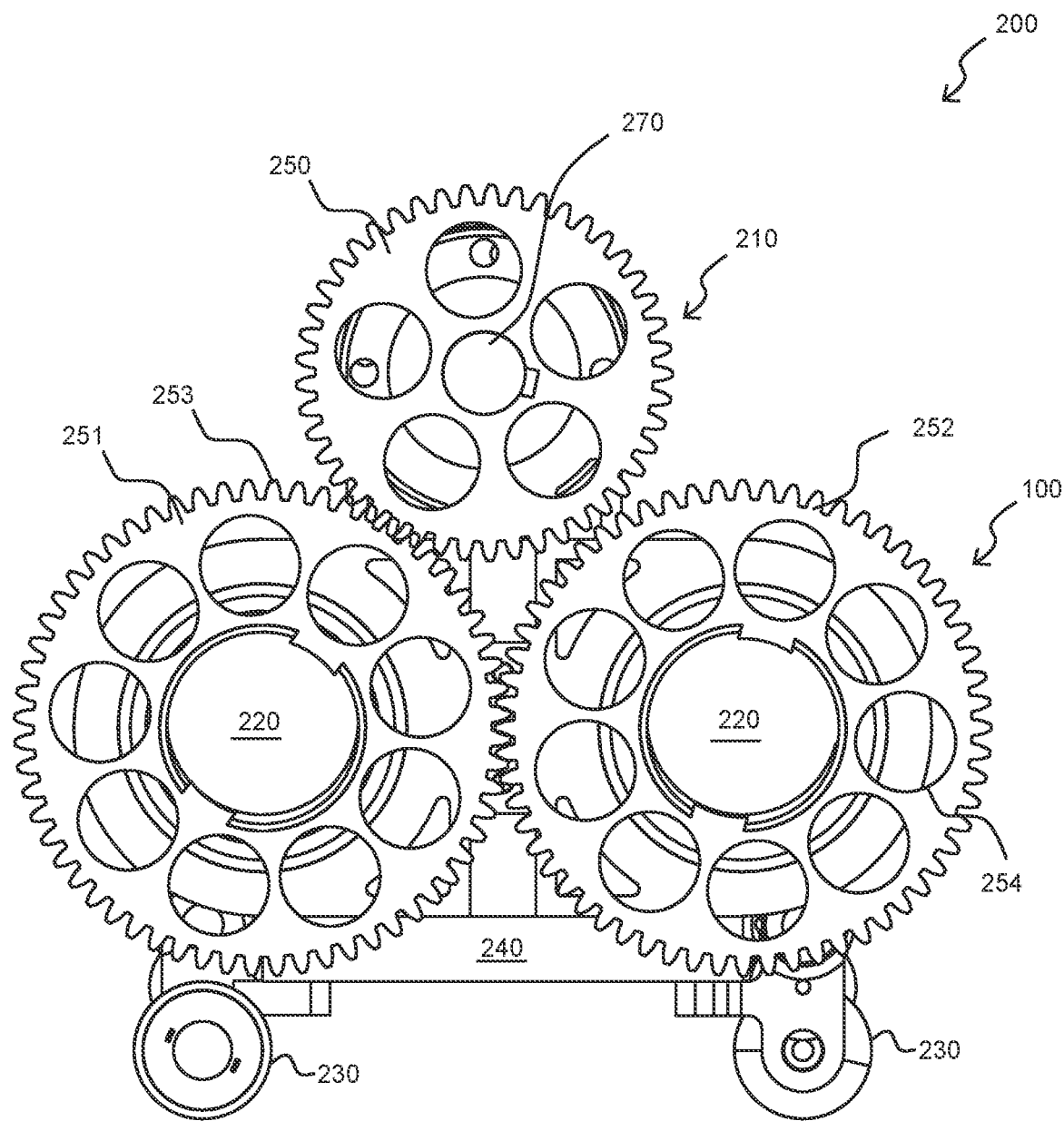
FIG. 5 is a front planar view showing the capstan actuator assembly according to the present invention as shown in FIG. 2.
Figure 6:
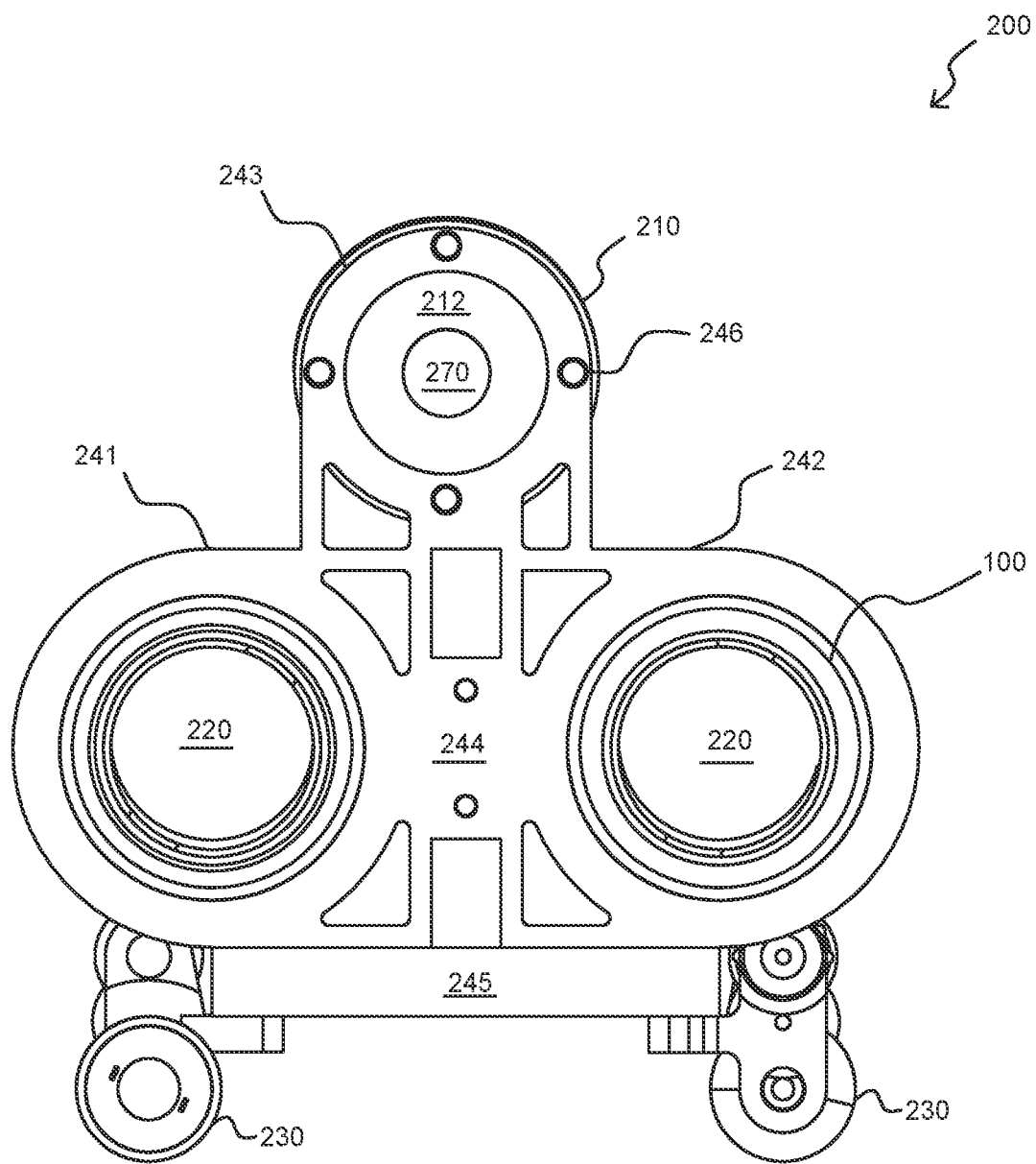
FIG. 6 is a front planar view showing the frame of the capstan actuator assembly according to the present invention as shown in FIG. 2.
Figure 7:
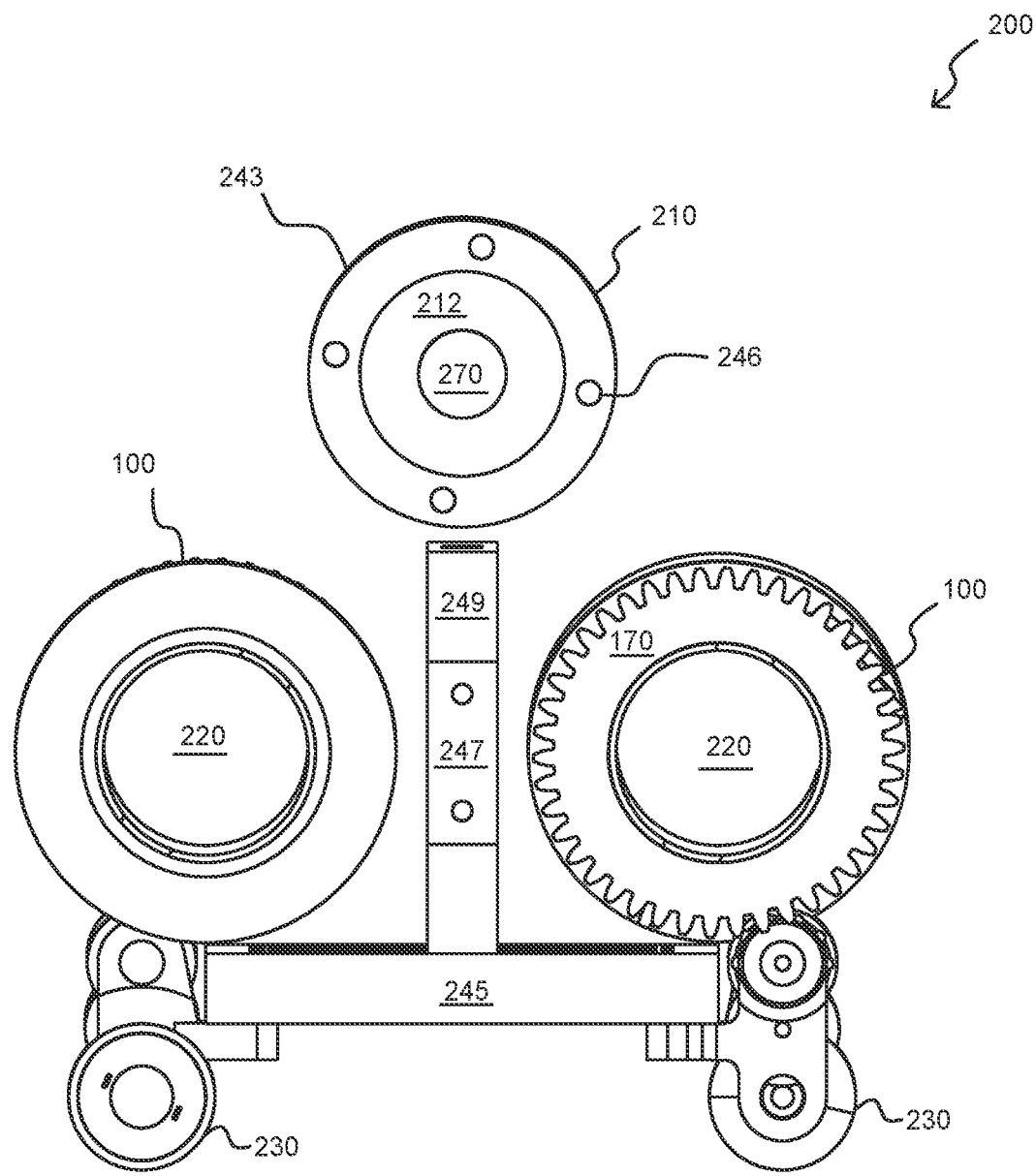
FIG. 7 is a front planar view showing the frame supporting the prime mover and two stacks of constricting coil friction clutches of the capstan actuator assembly according to the present invention as shown in FIG. 2.

FIGS. 5-7 are top-down perspectives of the system viewed while systematically removing first the prime mover gear 250, first input gear 251, and second input gear 252 to show the top portion of the frame having an upper arch 243 providing upper support for the prime mover 210. Arms 241 and 242 provide support along the top for each of the first and second capstan shafts 220; apertures 246 are also visible along the upper portion 243 and middle portion 244 of the frame top.

Figure 8:
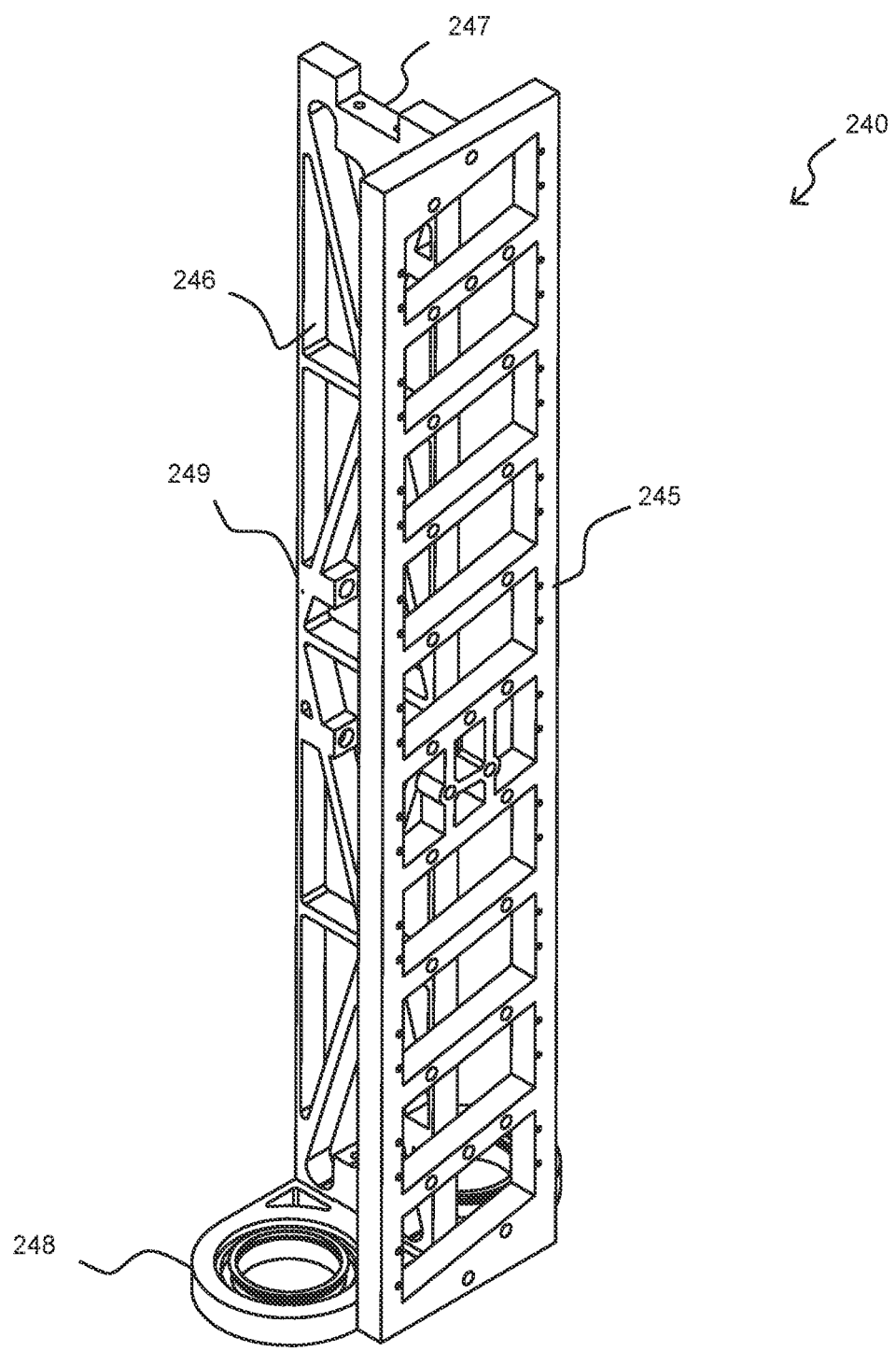
FIG. 8 is a side rear perspective view showing the frame of the capstan actuator assembly according to the present invention as shown in FIG. 2.

Once the frame top portion is removed, in FIG. 7, the prime mover 210 is visibly coaxially positioned with the prime mover shaft 270, and each of the stacks of coil clutches 100 are visibly coaxially positioned with their respective first and second capstan shafts 220, with each series of servos 230 likewise supported on opposing sides of the longitudinally extending frame portion 245. The frame 240 is shown in FIG. 8 with bottom base 248 supporting the first longitudinally extending frame portion 245, and the second longitudinally extending frame portion 249. The top portion of the frame is not shown in order to illustrate the connecting portion 247. Apertures 246 are provided along intervals of the frame to decrease overall weight, enable thermal flow, without reducing the structural integrity of the supporting frame 240.

FIGS. 9-15 Alternative Actuator Assemblies

FIGS. 9-15 show the main components of the actuator assembly systems according to various embodiments of the present invention: the prime mover 210, the constricting coil friction clutch (capstan coil) 100, and capstan shafts 220. With the low power end of the constricting coil friction clutch (capstan coil) connected to a control input 230, such as a low power servo, manual lever, or other method. The high-power end 150 of the constricting coil friction clutch (capstan coil) 100 shows where the output power is transmitted to the degree of freedom to be controlled via any mechanical transmission 290 such as a pull cable, gearing etc.. The rotating power input tube 220, that is rotated by the prime mover 210, supplies rotational power that is modulated by the constricting coil friction clutch (capstan coil) 100. As most aspects of these embodiments are similar in all respects to the invention as described, only the differences between these embodiments will be briefly discussed below.

Figure 9:
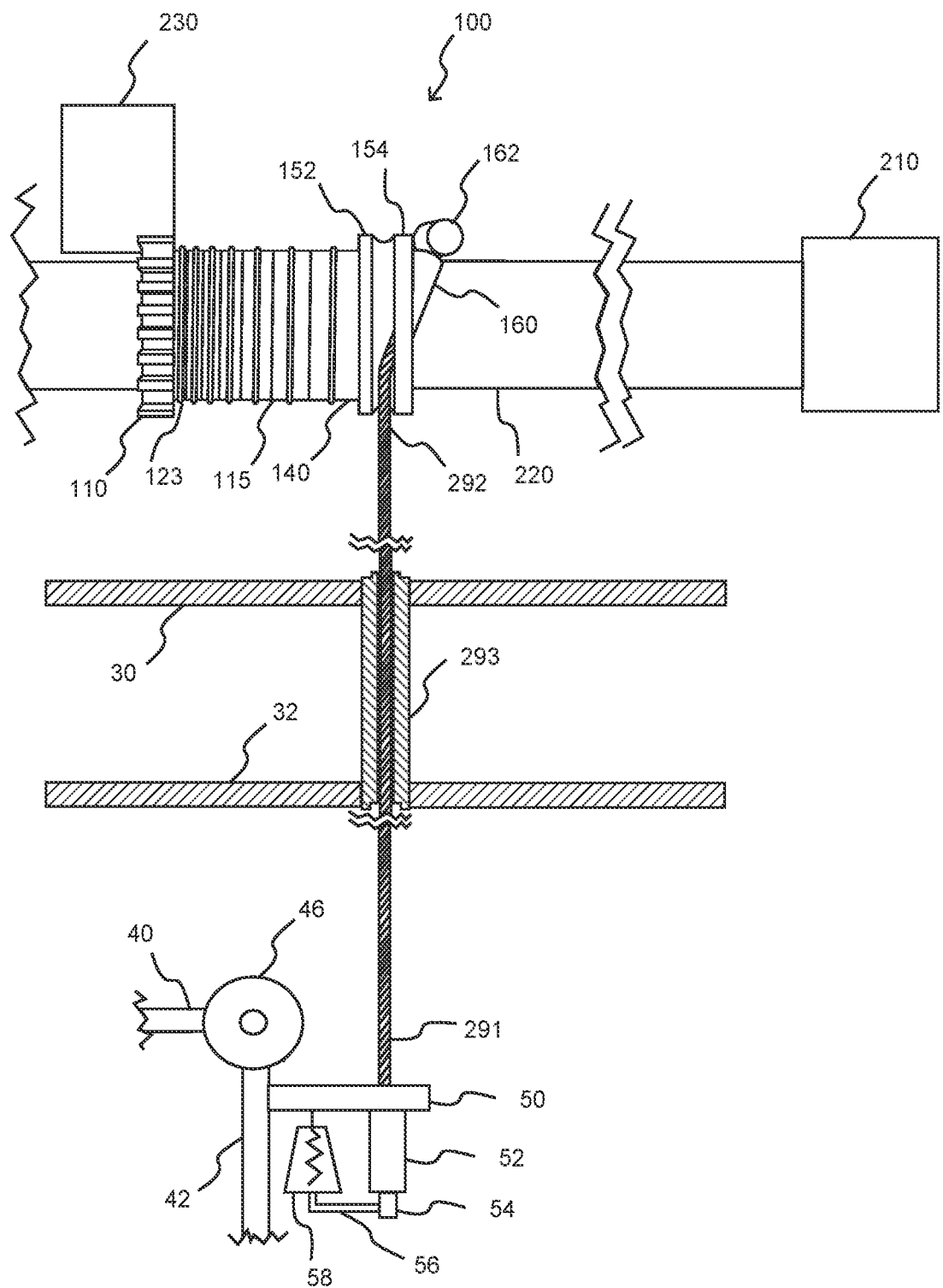
FIG. 9 is a side schematic showing an alternative capstan actuator assembly according to the present invention.

FIG. 9 illustrates the capstan clutch 100 controlling a mechanical transmission 290 at a second end 291 which is attached to a joint 46 having an arm 50 having a stiff spring for main control of positive forces (w=12 mm, H =28 mm, L =12 mm, W=0.02 kg) connected to a weak spring (w=6 mm, H =32 mm, L =6 mm, W=0.01 kg); which has a connection 56 to potentiometer 58.

Figure 10:
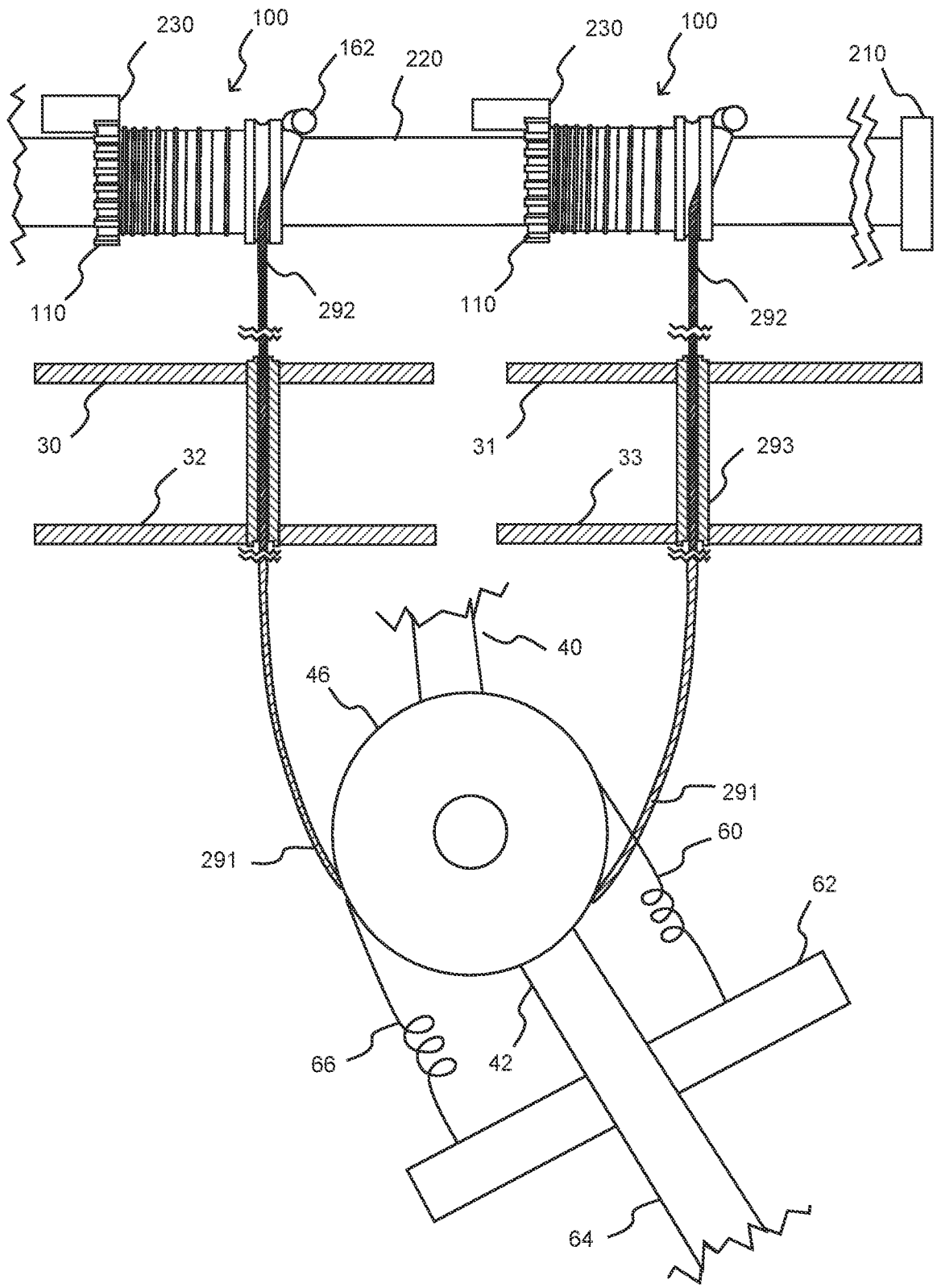
FIG. 10 is a side schematic showing an alternative capstan actuator assembly according to the present invention.

FIG. 10 illustrates two capstan clutches 100 controlling two degrees of freedom via mechanical transmissions 290 at second ends 291 which are attached to opposing sides of rotational joint 46 extending from arm 40. The link of the joint 42 is connected to balancing arm 62 which provides stabilizing support for first and second nonlinear springs 60, 66 (w=12 mm, H=28 mm, L=12 mm).

Figure 11:
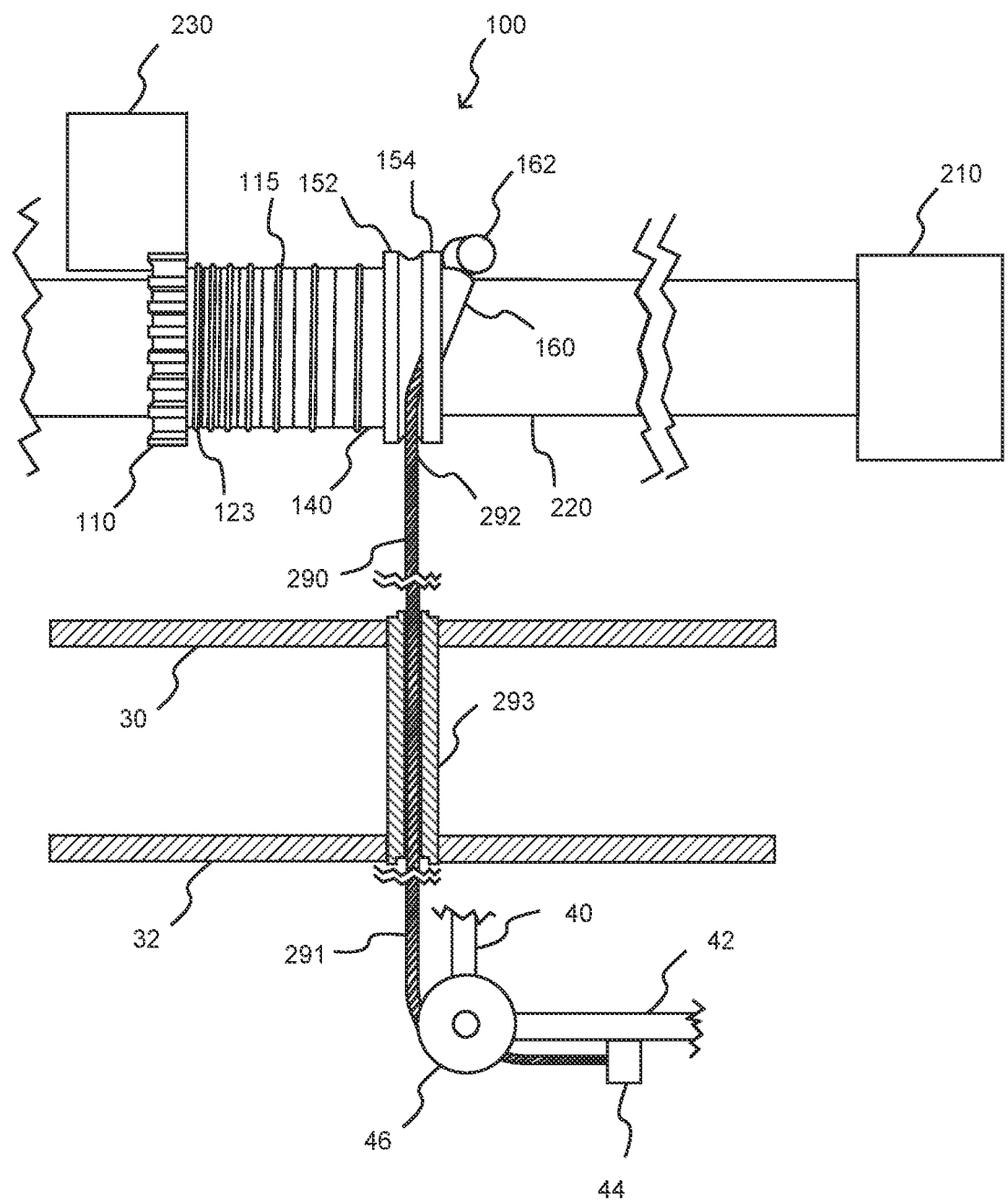
FIG. 11 is a side schematic showing an alternative capstan actuator assembly according to the present invention.

FIG. 11 illustrates a single capstan clutch 100 controlling a degree of freedom via mechanical transmission 290 extending through sheath 293 and walls 30, 32, and attached to a joint 46 which is attached to opposing arms 40, 42, and the mechanical transmission 290 being connected to the output cable anchor point there along.

Figure 12:
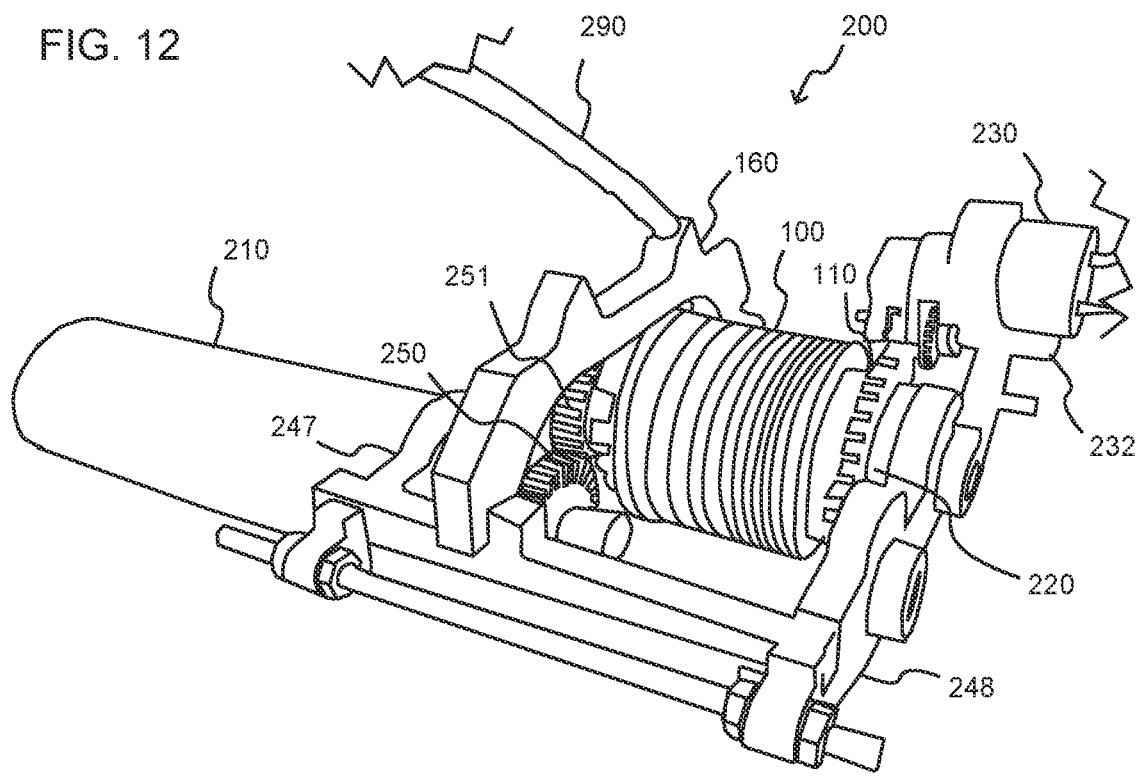
FIG. 12 is a side schematic showing an alternative capstan actuator assembly according to the present invention.
Figure 13:
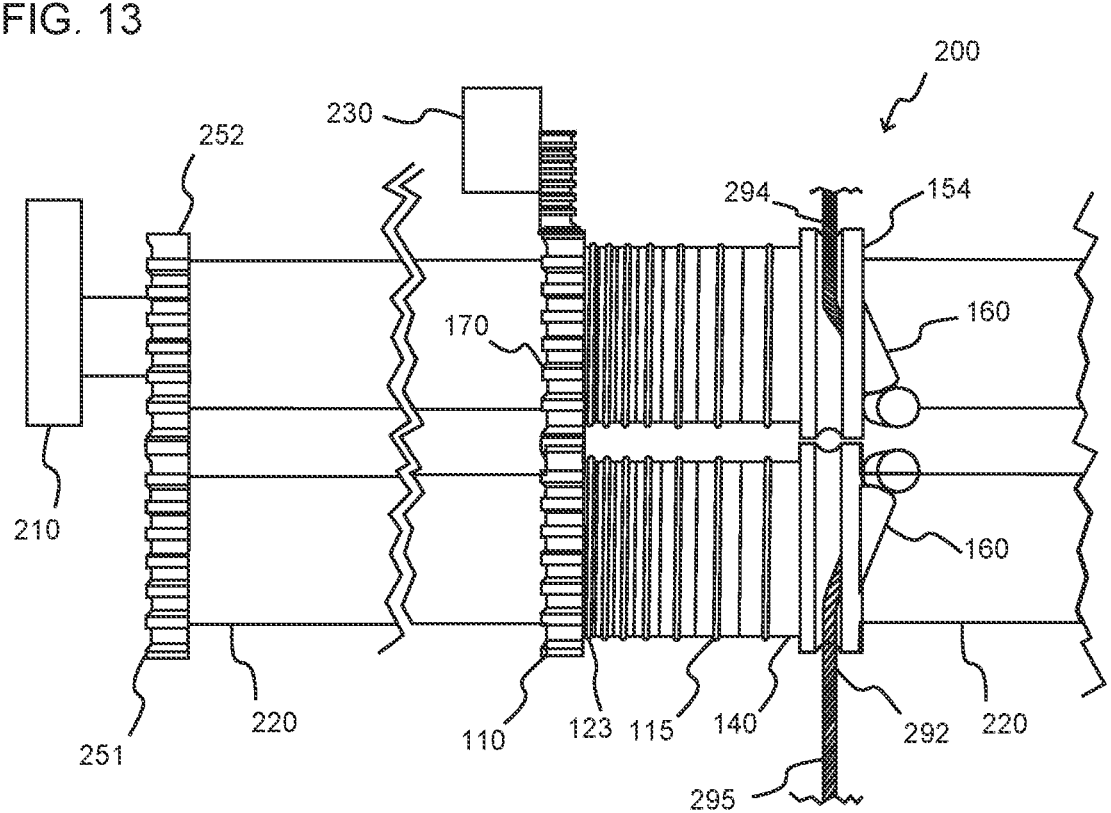
FIG. 13 is a side schematic showing an alternative capstan actuator assembly according to the present invention.
Figure 14:
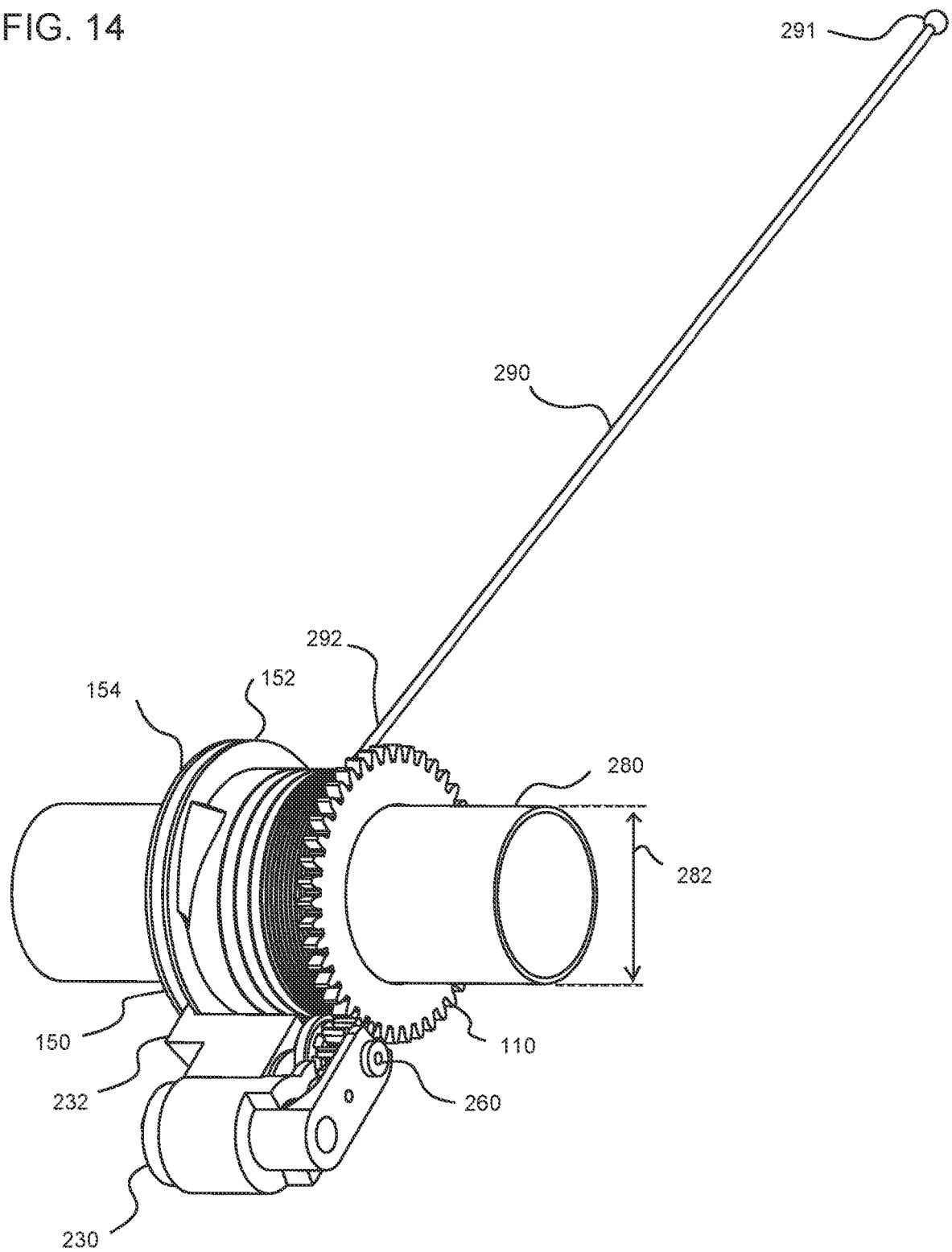
FIG. 14 is a perspective view showing a constricting coil friction clutch according to the present invention.
Figure 15:
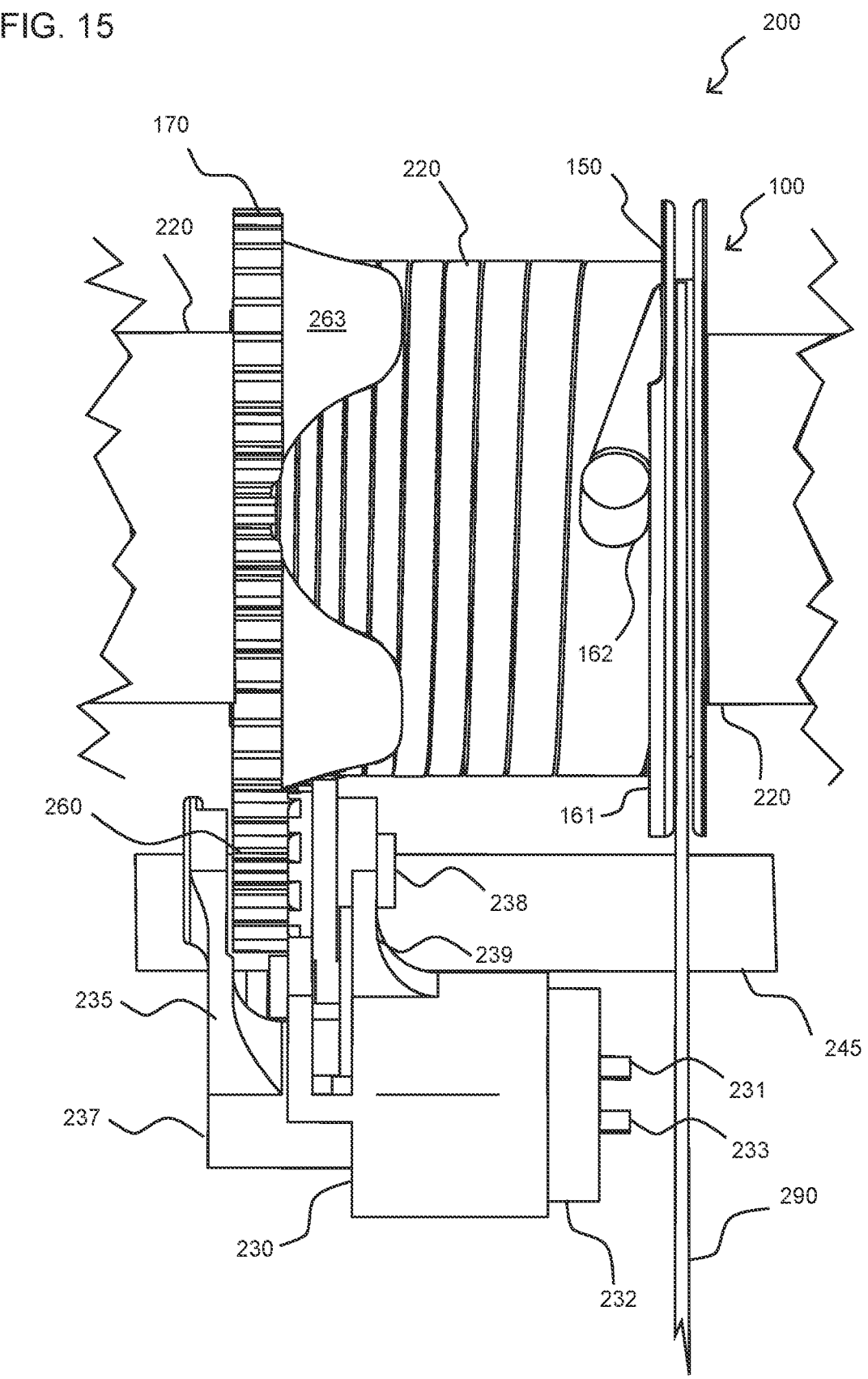
FIG. 15 shows a side view showing a cord and capstan.

FIG. 12 illustrates a singular single capstan clutch 100 system. The frame 240 is shorter with only a singular capstan clutch. The prime mover primary gear 250 is connected directly to the first output gear 251 which is connected to the capstan shaft 220. FIGS. 13-15 provide yet further embodiments and alternatives with a closer view of interactions between the components of the present invention as discussed elsewhere herein.

FIGS. 16-33 Coil Clutches

Techniques for facilitating actuating robots and automatic machines without using capstan actuator with the composite control coil are deficient with regard to several aspects. For instance, these technologies do not allow a single prime mover to supply motive power to many other degrees of freedom with very good control fidelity. Attempts to employ coil clutches using common flexible cords or rope do not eliminate the tendency of the rope coil to bind and grip the capstan tube even when the control servo tries to loosen the coil for better control at high loads. Furthermore, this style of coil does not facilitate the controlling and actuating of robots and other complex machines that are significantly cheaper to make and lighter in mass than current designs that tend to be bulky, heavy, and expensive because they generally have large motors located at every joint.

Furthermore, these technologies have lower control bandwidth because the inertia of the large control servo in the capstan actuator is much more than that of the smaller motor. Further, current technologies do not reduce the passive friction at low control forces that allow the capstan coil to be loosened to reduce parasitic friction. Current technologies further work for a small number of wraps, but if there are more than 5 wraps, the coil tends to bind on the capstan tube, especially when an individual may be trying to release or loosen the coil that may cause the control system to fail. The more wraps there are in the coil, the higher the force amplification, as indicated by the capstan equation. Moreover, current technologies do not allow a single long capstan tube to control many rigid capstan coils at the same time making for a compact low mass, low-cost design.

Further, the costs of a conventional motor at every joint design, or in the case of hydraulics where the control valves and output pistons are much higher, thus drastically increasing the cost of the machine (by an estimated factor of 4-6 times at least). Further, current technologies do not allow for very low forces to be controlled in the capstan coil that increasing losses in the capstan coils to occur when the desired force is zero, which will make the overall system use more power. Furthermore, current technologies do not allow for easy high bandwidth control of the joint as a damper that can control the damping of a joint with high bandwidth, velocity, and power to mass ratios. Further, current technologies do not allow 20 for efficient stacking of multiple degrees of freedom powered by a single prime mover.

The present coil clutch overcomes these difficulties and provides a technology with greater control bandwidth despite the inertia of the large control servo in the capstan actuator being more than that of the smaller motor. The present invention provides a technology which reduces the passive friction at low control forces that allow the capstan coil to be loosened to reduce parasitic friction. The present invention provides a technology which works for a small number of wraps, and works for far more than 5 wraps, preventing the coil from binding on the capstan tube, especially when an individual may be trying to release or loosen the coil that may cause the control system to otherwise fail in other systems. The more wraps there are in the coil, the higher the force amplification, as indicated by the capstan equation. The present invention enables a much higher number of wraps which results in a much higher force amplification. This enables alternative power sources to be employed effectively without greatly increasing the cost of production. Moreover, the present technology allows a single long capstan tube to control many rigid capstan coils at the same time making for a compact low mass, low-cost design.

Further, by avoiding the costs of a conventional motor at every joint design, or in the case of hydraulics where the control valves and output pistons are much higher, the present invention drastically decreasing the cost of the machine (by an estimated factor of 4-6 times at least). Further, the present invention allows for very low forces to be controlled in the capstan coil that decreasing losses in the capstan coils to occur when the desired force is zero, which will make the overall system use less power. Furthermore, the present technology allows for easy high bandwidth control of the joint as a damper that can control the damping of a joint with high bandwidth, velocity, and power to mass ratios. Further, the present inventive technology allows for efficient stacking of multiple degrees of freedom powered by a single prime mover.

As previously discussed, the disclosed system consists of a novel configuration that allows actuation and control of the joints of complex robots and other machines with a number of unique advantages over existing systems. Further, the disclosed system allows the use of a single, or small number, of prime movers (typically an electric motor, but this could be any source of mechanical power in theory), to be distributed to an arbitrary number of degrees of freedom in a machine. The power may be sent to the various joints in a controlled, stable, smooth manner, using conventional PID control techniques (as shown in other figures). This allows for mass, cost and complexity to be greatly reduced as compared to conventional robots and other machines (henceforth the term "robot" may mean both robots and other automation machines and tools with multiple degrees of freedom). Also, the control can be improved due to the lower reflected inertia of the transmission.

Further, each output channel associated with the disclosed system consists of a plastic coil, called the capstan control coil, that is geared at one end to allow a small servo motor to engage that end of the coil for the control input. Further, an external cord is wrapped and glued along the outside of the plastic coil. The external cord is important as it lends strength to the coil and helps prevent the nylon from stretching over time. The nylon lakes most of the force however and also makes a very robust surface that has good long-term wear characteristics. Further, the coils are constructed in a hybrid or composite structure. This allows for many more windings to be used, and therefore higher amounts of force to be transmitted through the coil, than would be possible with a rope, because beyond about 8 windings or so, a rope may start to bind and be uncontrollable since you would not be able to loosen it from the capstan when needed.

Figure 16:
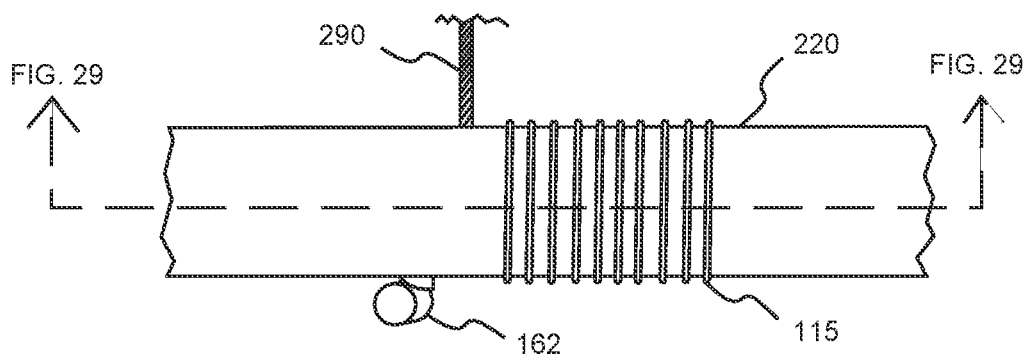
FIG. 16 shows a side view of a constricting coil friction clutch according to the present invention.
Figure 17:
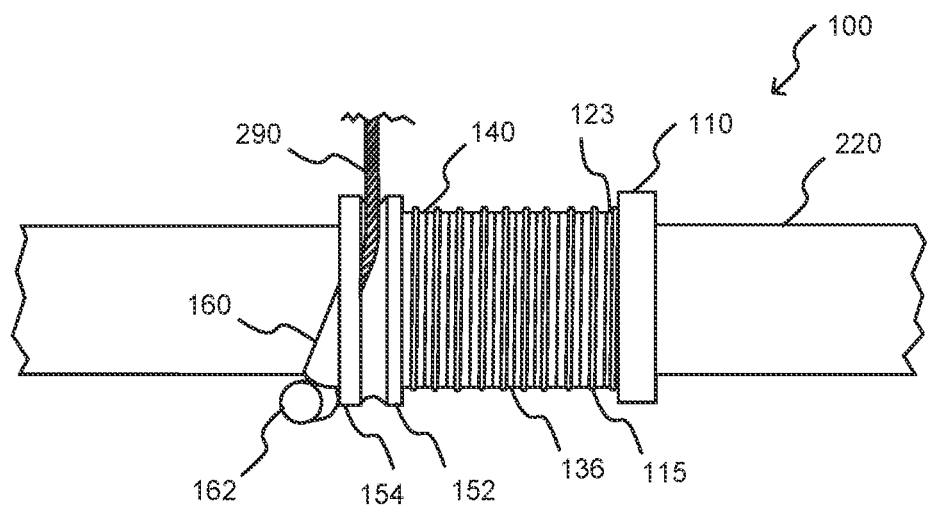
FIG. 17 shows a side view of a constricting coil friction clutch according to the present invention.

The coils in the disclosed system have the equivalent of 12.5 windings, and they do not bind or cause any other control problems. The other end of the coil attaches to the joint to be controlled via a gear, pull the cable, or other mechanical means. Further, the disclosed system may use a rigid plastic (or other material) capstan coil, as opposed to a rope or string (as shown in FIG. 16). Further, the shape associated with the rigid plastic material may be a thick rigid material (not a rope or string) and may include have thicker wraps at the power end and thinner ones at the control end with a rope thickness that may be the same as the whole length (as shown in FIG. 17).

The invention uses very low cost, low mass capstan coils as controllable constricting friction clutches, instead of relatively bulky, expensive and complex servo control valves typically found in existing OTM systems, such as hydraulics and pneumatics. The invention consists of a single, or small number of prime movers, which could be electric motors or other methods of producing mechanical power, and that power is used to rotate a capstan tube that is long enough to accommodate a number of capstan coils in a stacked configuration. This is an efficient method of combining a large number of capstan coils onto a rotating capstan tube. Each capstan coil is actuated by a small low-cost electromechanical servo, such a typical hobby servo, that drives one end of the coil.

The capstan coil then acts as a controllable sliding friction constricting clutch against the rotating surface of the powered capstan tube. At the opposite end of the coil from the micro servo, the power generated by the coil is transmitted to the desired degree of freedom by a mechanical transmission, such as a Bowden cable. By transmitting the power of the capstan tube through friction, the capstan coil can distribute the power of the capstan tube to a given degree of freedom in the machine or robot. The power can be distributed to the degree of freedom using a low mass, low-cost transmission method, such as a Bowden cable, drive belt, gear, or other method.

Since the invention is a OTM system, it has the advantages of all OTM systems in that the mass and cost increase fractionally with the addition of more degrees of freedom, resulting in a relative lower mass and lower cost and more compact system design than would be possible with a comparable MTM design. In addition, because the invention is a pure electromechanical design, and has no fluids, oils, or need for high pressure seals, servos or components, as found in existing OTM systems, the invention does not have the disadvantages that existing OTM systems have. This means that the invention is superior to existing OTM systems.

Since the invention is an OTM electromechanical system, is does not have the disadvantages of existing MTM systems. Existing MTM systems increase in cost mass and size linearly with the addition of additional degrees of freedom, whereas the invention only increases fractionally, and is therefore superior.

The cost of manufacturing a capstan coil 100 according to the present invention is at least an order of magnitude (10×) less than the cost of an equivalent motor that would be used in a typical MTM system. For example, a robot that uses an RE40 Maxon DC electric motor, would cost about $700 to $1,000, whereas the cost of a capstan coil and micro servo set would in the range of about $50 to $100 in production.

In the invention, each capstan coil can generate forces in one direction. Therefore, for a simple pin joint, or a joint that requires positive and negative forces, two capstan coils would be needed in opposition. For a multiple degree of freedom joint, with N degrees of freedom, N+1 coils would be needed. One advantage of using capstan coils with Bowden cables over other mechanical transmissions, is that simple ball joints can be used for multiple degree of freedom joints in machines and robots, since each Bowden cable can be independently controlled and tensioned, no matter the geometry of the joint.

Figure 18:
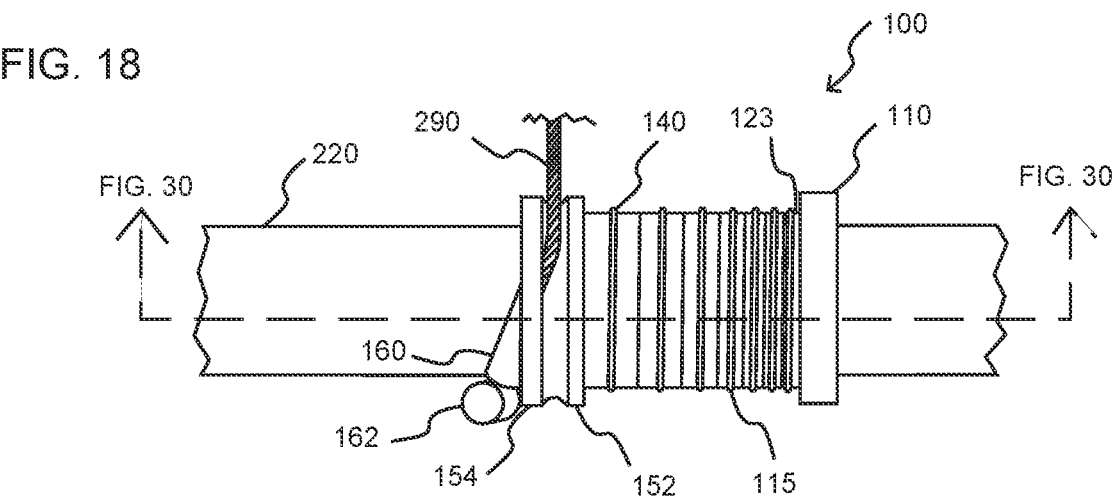
FIG. 18 is an enlarged side view showing an alternative capstan actuator assembly according to the present invention.
Figure 19:
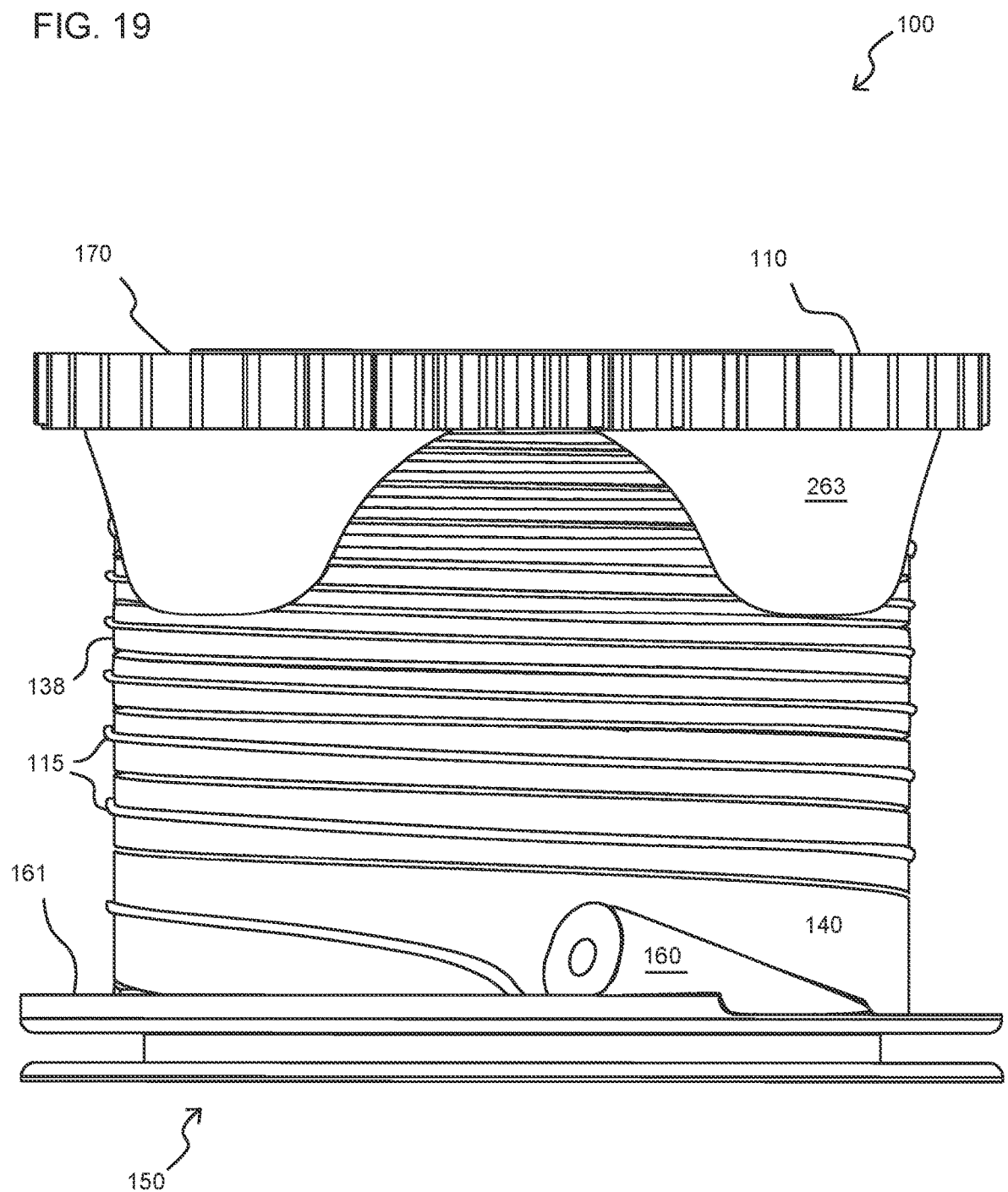
FIG. 19 is an enlarged side view showing the constricting coil friction clutch according to the present invention.
Figure 20:
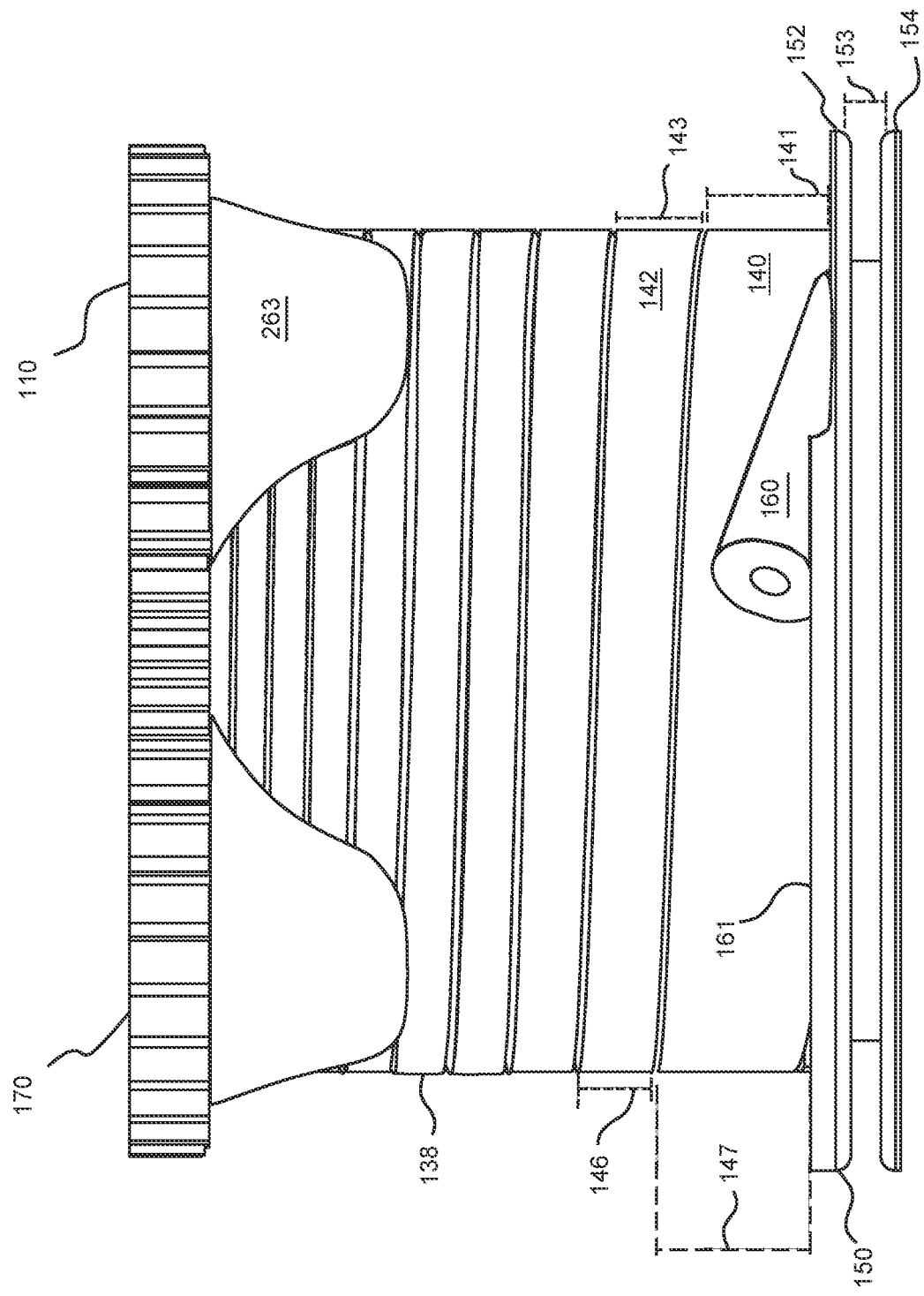
FIG. 20 is an enlarged side view showing the constricting coil friction clutch according to the present invention.
Figure 21:
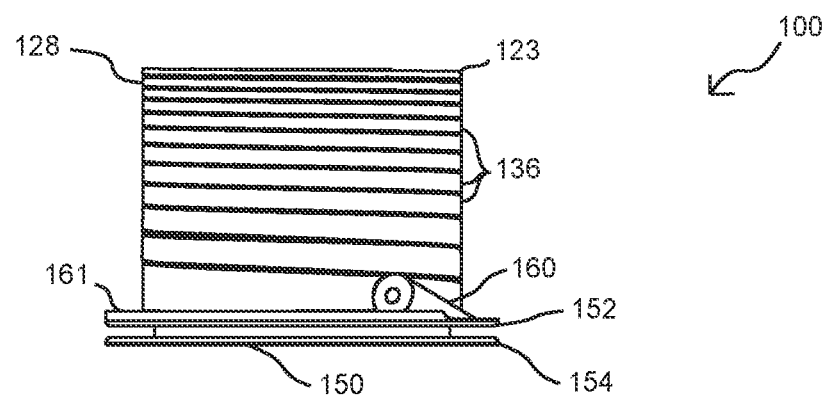
FIG. 21 is a side planar view showing the constricting coil friction clutch according to the present invention.
Figure 22:
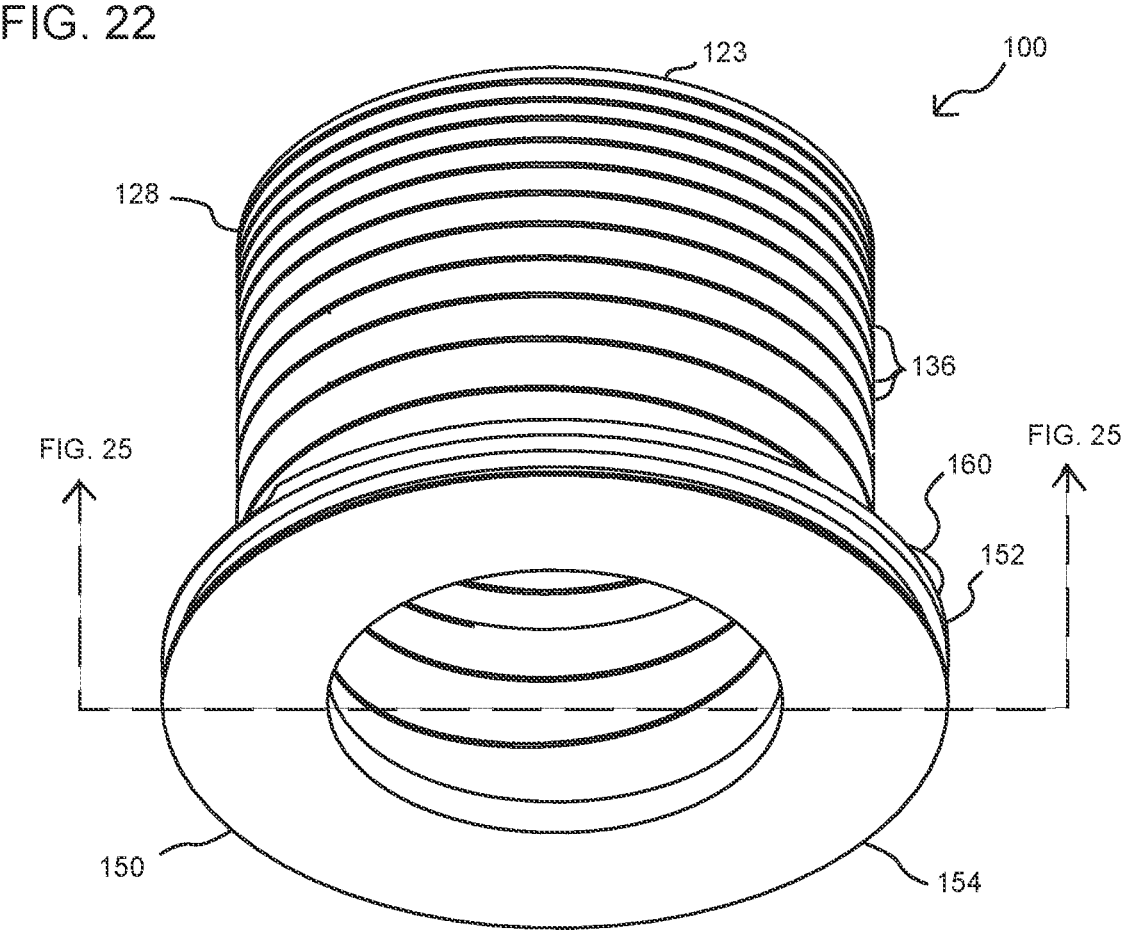
FIG. 22 is a bottom side perspective view showing the constricting coil friction clutch according to the present invention.
Figure 23:
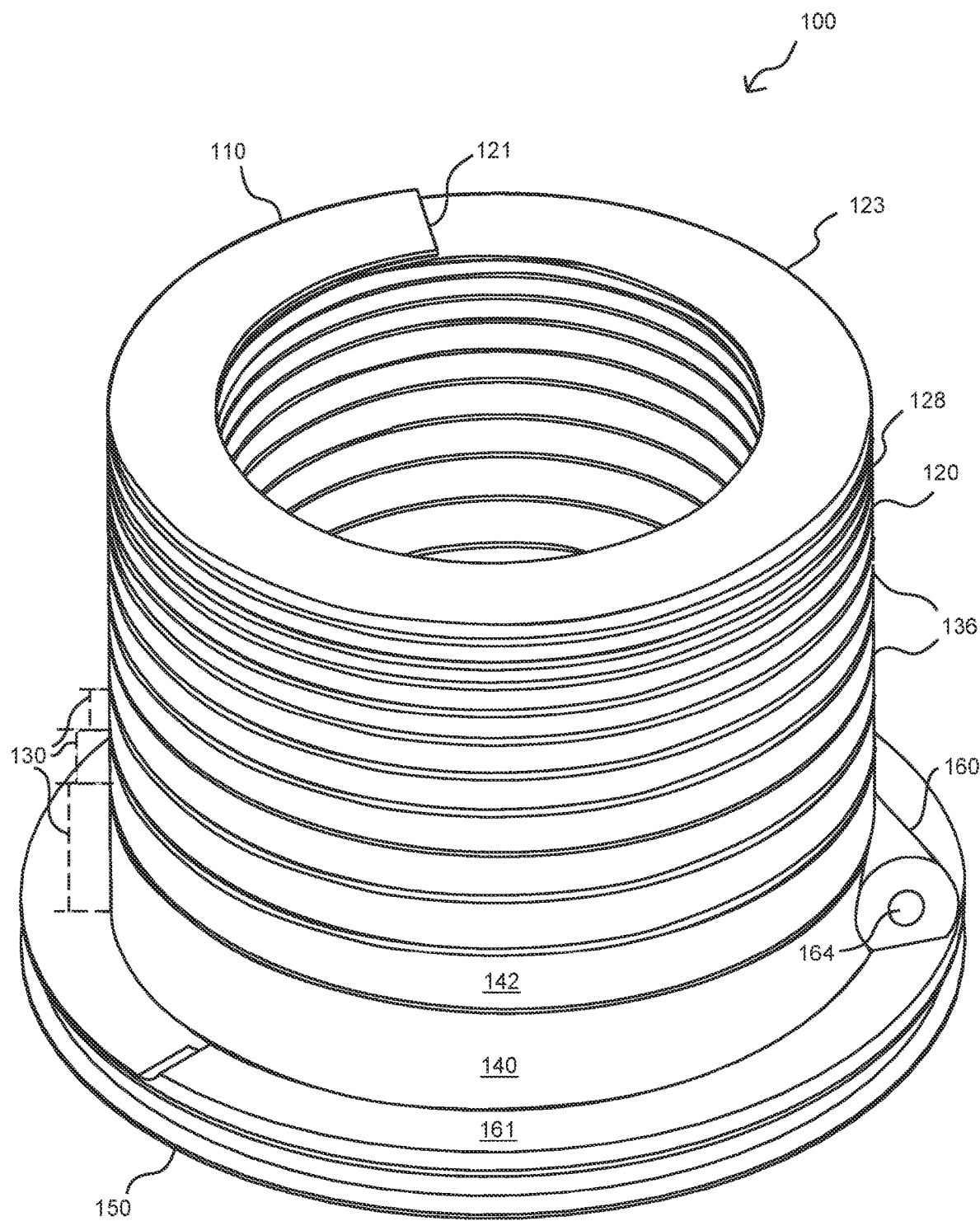
FIG. 23 is an enlarged top front perspective view showing a constricting coil friction clutch according to the present invention.

FIGS. 16-32 shows side views of the different embodiments of the coil clutch according to the present invention. Each of FIGS. 16-18 show these coil clutches 100 positioned upon the rotating power input tubes (capstan tube) 220 associated with the systems 200 for facilitating the actuation of automatic machines and robots 1. Each of FIGS. 19-21 show different embodiments of the coil clutches in similar points of view for ease of comparison. FIGS. 22-23 show different points of view of the coil clutch of FIG. 21. Each of FIGS. 22-32 show different points of view of various coil clutches in order to discuss various aspects and alterations of the coil clutches of the present invention.

FIG. 16 is a side view of the capstan tube 220 and the 3D oriented control coil 115 associated with the system 200 for facilitating actuating robots and automatic machines 1 using capstan actuator consisting solely of composite control coil 15. As discussed above, there were disadvantages found with this version of the actuator. These embodiments having the friction clutches 100 constricting solely of the coil style cords 115 have important limitations in comparison to other embodiments. Employing flexible material 115 alone for the constricting coils results in increased friction binding when there are more than about 5 wraps, or turns, in the coil about the capstan shaft 220.

The power output of the friction clutch 100 is exponentially proportional to the number of wraps 120 of the constricting coil. In order to overcome the difficulties associated with friction binding for a higher number of solid material layers 120, use of a solid or rigid material was found to be desirable. This simultaneously means that the wraps 120 now have sufficient stiffness to be both pulled on and pushed upon by neighboring wraps in the coil. Thus, this further enables each wrap to be capable of both pushing and pulling from the input end 110 to the output end 150. This ability to both pull and push prevents the problem of friction binding which occurs in coils made with a flexible material such as rope or string, having more than about 5 wraps or turns in the coil.

FIG. 17 illustrates a side view of a capstan tube 220 and an alternative coaxially aligned capstan clutch 100 with control coil 115 associated with the system 200 for facilitating actuating robots and automatic machines 1, in accordance with some embodiments of the present invention. In this embodiment, the clutch layers 120 are made of a rigid material which helically wind around a center axial hollow aperture. Because layers 120 consist of a rigid material, together, they form a solid columnar shape, with the center hollow aperture visible in FIGS. 22 and 23.

FIG. 18 illustrates a side view of the capstan tube 220 and the 3D oriented capstan clutch 100 with control coil 115 and tapered layers 120 associated with the system 200 for facilitating actuating robots and automatic machines 1, in accordance with some embodiments.

FIG. 19 illustrates a side view of the capstan friction coil clutch 100 with control strengthener 115 and tapered layers 120 associated with the system 200 for facilitating actuating robots and automatic machines 1, in accordance with some embodiments of the present invention.

FIGS. 16, 17, 29-31 are provided to facilitate a discussion regarding the differences that occur in binding properties in coils made from flexible material (such as rope or string) and rigid or semi rigid material (plastics, composites, metals, etc.).

The inventor has discovered that if there are more than about 8 wraps of a flexible material in a constricting coil friction clutch 100 that directly contact the capstan shaft 220, that the last few coils 116, 117 (those at the highest loads, as governed by the capstan equation) tend to bind, and cannot be released from the rotating power input tube (capstan tube) 220 even if the initial wraps 111, 112 are made completely slack or loose.

Figure 30:
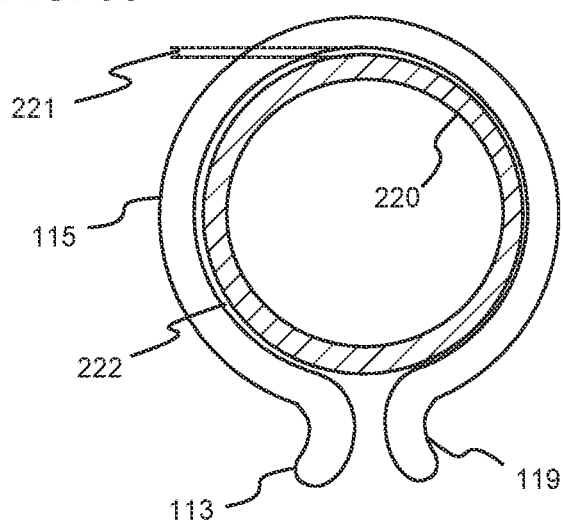
FIG. 30 is a top cross-sectional view showing measurements of one embodiment of the constricting coil friction clutch on a capstan shaft according to the present invention.
Figure 31:
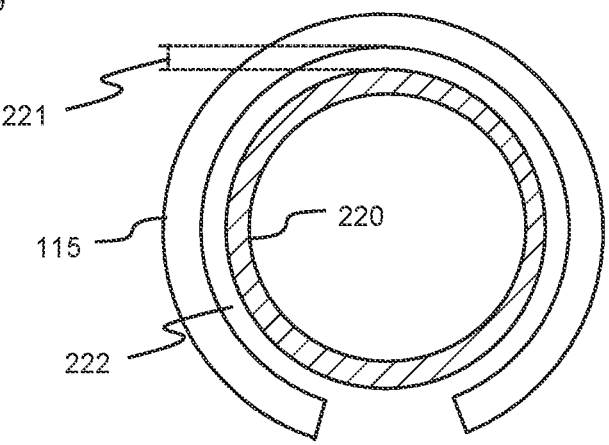
FIG. 31 is a top cross-sectional view showing measurements of one embodiment of the constricting coil friction clutch on a capstan shaft according to the present invention.

FIGS. 30, 31 show this binding effect schematically in an individual wrap or layer from a typical coil, in both a constricting (tightening) and loosening case. In the constricting case, either a flexible or rigid or semi rigid material may be used, since the materials can be "pulled tight" in either case. However, for loosening, the rigid or semi rigid material can be opened up away from the rotating power tube, and thus the friction of the coil against the tube can be reduced to zero, and the coil can be totally disengaged from the rotating power tube.

However, in the case of a flexible material, the material will tend to deform elastically at ends 113, 119 without "opening up" the space 222 between the coil 115 and the shaft 220. Since the wrap will still be at least partially in contact with the rotating power input tube, there will be friction present, which will be amplified by the system gain as governed by the capstan equation. This parasitic force is called "binding" and prevents the flexible material from being the best choice for constricting coil friction clutches (capstan clutches) with more than about 7 wraps.

This has limited prior attempts to form similar clutches that have attempted to use flexible rope or other flexible material, to about 6 or 7 total wraps, to maintain usable controllability. It can be shown using the capstan equation that 7 wraps allow for the coil to amplify the input torque by about a factor of 31. There are many applications where significantly higher power gains will be needed to be practical (such as is the case in a walking robot, or and industrial machine with high loads).

The invention uses a rigid or semi rigid material (such as metal, composite, plastic, etc.) and this allows the gain to be increased many-fold beyond this. In our test apparatus, coils with 13 wraps were used, which corresponds to a gain of about 643 (as compared to about 31 in the case or rope or string with only about 7 wraps).

That is, the coil consists of a number of wraps, and as governed by the capstan equation, each wrap experiences a different load from the next. The amount of load experienced by each wrap increases exponentially as you go from the first (i.e. lowest power) to the last (i.e. highest power) wrap.

As an example, in a typical coil with 13 wraps, given a friction coefficient of 0.5, the amount of force amplification of the wraps according to the capstan equation:

$$Tt=e^{(Fc*Numw)}$$

where:
Tt=total torque output of friction coil;
Fc=Friction coefficient of coil against capstan tube;
Numw=total number of wraps in coil.

For each of the wraps then, the force amplification is as follows: wrap 1=amplification 1.6, wrap 2=amplification 2.6, wrap 3=amplification 4.4, wrap 4=amplification 7.2, wrap 5=amplification 12, wrap 6=amplification 19.6, wrap 7=amplification 31, wrap 8=amplification 52, wrap 9=amplification 87, wrap 10=amplification 141, wrap 11=amplification 241, wrap 12=amplification 394, and final wrap 13=amplification 643. This means that for a coil with 13 total layers 20, the power output has a total amplification of a factor of 643.

These higher gains are possible because in a rigid or semi rigid material, it is possible to both pull and push, whereas with a flexible material such as rope or string, pulling is possible only. Since wraps in the constricting coil friction clutch can push their neighboring wraps open, they can actively loosen the higher power wraps of the constriction coil, and thus overcome the binding problem that prevents flexible material from being used for the coils. It has been determined experimentally that the cross-section shape of and the material used for the wraps of the rigid or semi rigid constricting coil friction clutch is very important for utility and life span of the invention.

The material must be strong enough to withstand the peak force at the highest force part of the coil. In the case of rope or other flexible material, this means that the breaking strength of the rope must be greater than the peak load seen by the highest power wrap of the coil. If a rigid or semi rigid coil is fabricated using a material of fixed thickness, this means that the breaking strength of the rigid or semi rigid material must greater than the peak load seen by the highest power wrap of the coil (as is the case with rope or other flexible material).

Figure 26:
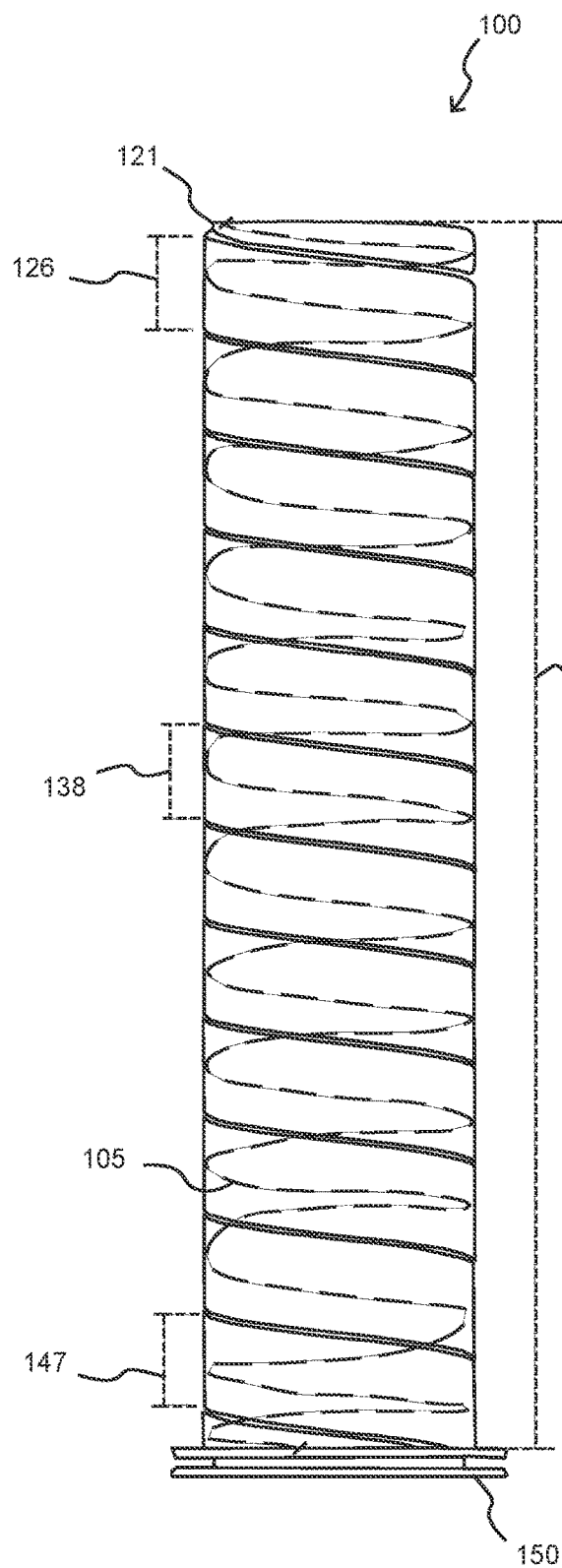
FIG. 26 is a side planar view showing measurements of one embodiment of the constricting coil friction clutch according to the present invention.
Figure 27:
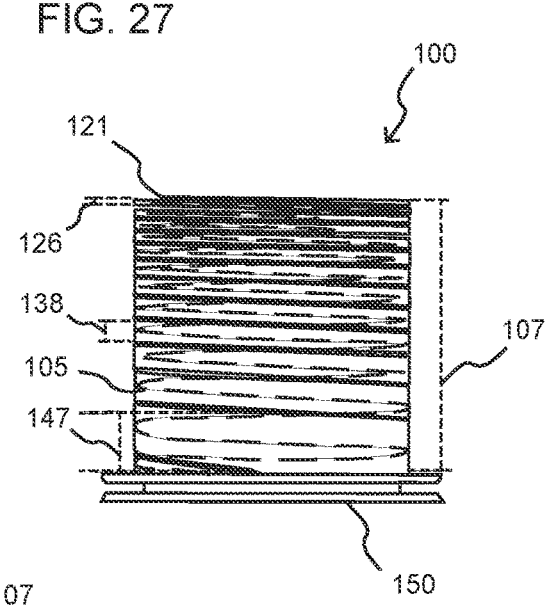
FIG. 27 is a side planar view showing measurements of one embodiment of the constricting coil friction clutch according to the present invention.
Figure 28:
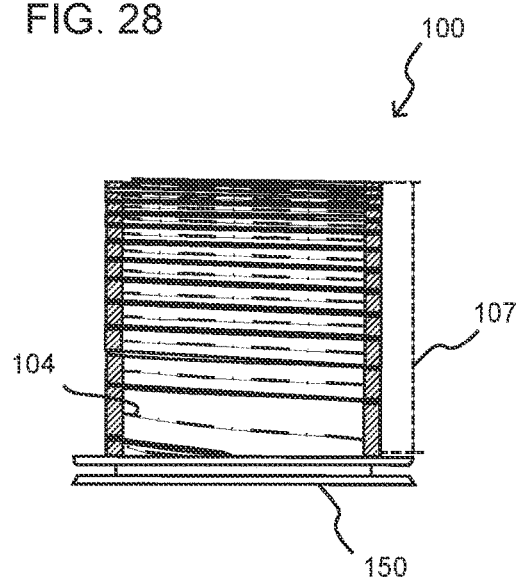
FIG. 28 is a side planar view showing measurements of one embodiment of the constricting coil friction clutch according to the present invention.

FIGS. 26-28 are provided to facilitate a discussion regarding the advantages of tapering or varying the width 126, 138, 147 of the individual wraps 120 in the constricting coil friction clutch (capstan coil) 100. As easily visualized here, by reducing the first width 126 compared to the last width 147, the overall width 107 of the coil 100 is made much smaller.

The thickness of each wrap 120 in the coil 100 can be increased as the wraps 121 go from the high-power end 110 of the coil (the high power output end) to the low power end 150 of the coil (the low power servo input end). This allows for the material strength to be used efficiently, since the wraps at the low power end 121 do not need to be as strong or as thick as the wraps adjacent to the higher power end 150 as governed by the capstan equation discussed elsewhere herein.

As seen by comparing the overall widths 107 between the clutches 100 in FIG. 26 and FIG. 27, the coil 100 that has been optimized for total width 107 is significantly smaller in size than the one that has not. This enables embodiments such as shown in FIG. 1, where a number of these smaller size coils 100 can be stacked on one rotating power input tube 220 in a manner what would be impossible with the longer style coils. Since no prior art has been found that combines the use of rigid or semi rigid materials in a constricting coil friction clutch in combination with varying width wraps to optimize and minimize the coil length, this version of the coil clutch 100 provides marked improvements overall currently available technologies.

The coils can be made from more than one material, could be composite, or have different wraps made of different materials. These different materials can be arranged in any manner or combination, including radial composition or axial composition. The variation in width of each wrap in a coil need not adhere strictly to the capstan equation, instead it could be varied in any manner to allow for reduction in total coil width. This invention covers the case where the width of the coil wraps varies in a manner that is intended to reduce the overall width of the coil, so that they can be stacked in a minimum total size.

For the embodiments shown herein, the layers 120 have an input connection layer 123 and final output connection layer 140 where the associated widths vary differently than the general tapering throughout the entire coil 100 as these are welded, glued, or otherwise bonded with the output and input ends of the coil 100 overall. However, the right-side width 129 of the first (full) layer 128 is 1 mm, the width 138 of the interim layer 136 is 2.5 mm, and the largest width 147 associate with the last (full) layer 142 is 8 mm. This results in an overall tapering ratio of 1:8 from first to last layers 120. However, it is to be understood that this tapering ratio could also include ranges of ratios between 1:1 to 1:30, more typically a range of 1:2 to 1:15, and more preferably, a range of 1:4 to 1:10.

Figure 24:
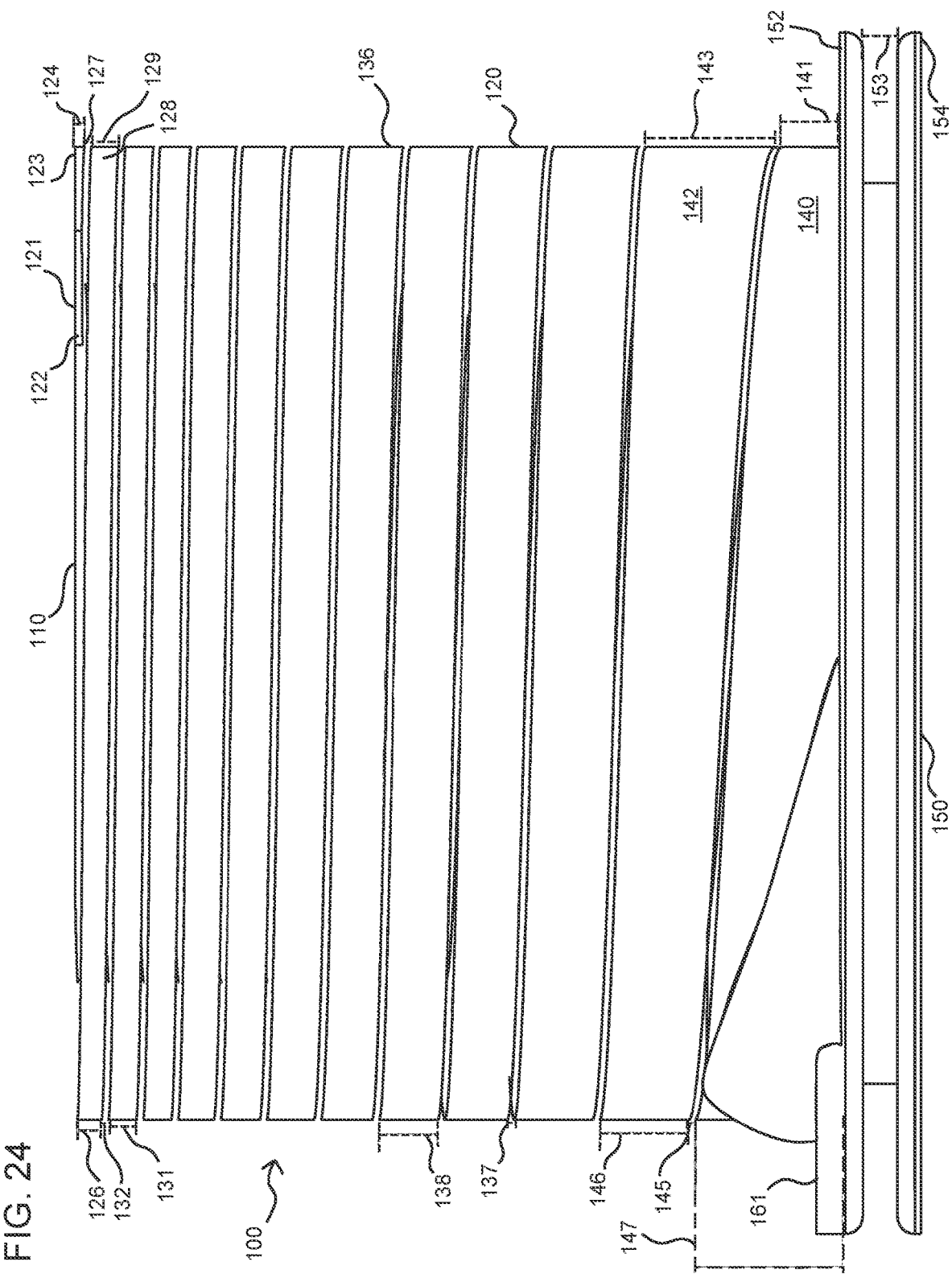
FIG. 24 is a side planar view showing measurements of the constricting coil friction clutch according to the present invention.
Figure 25:
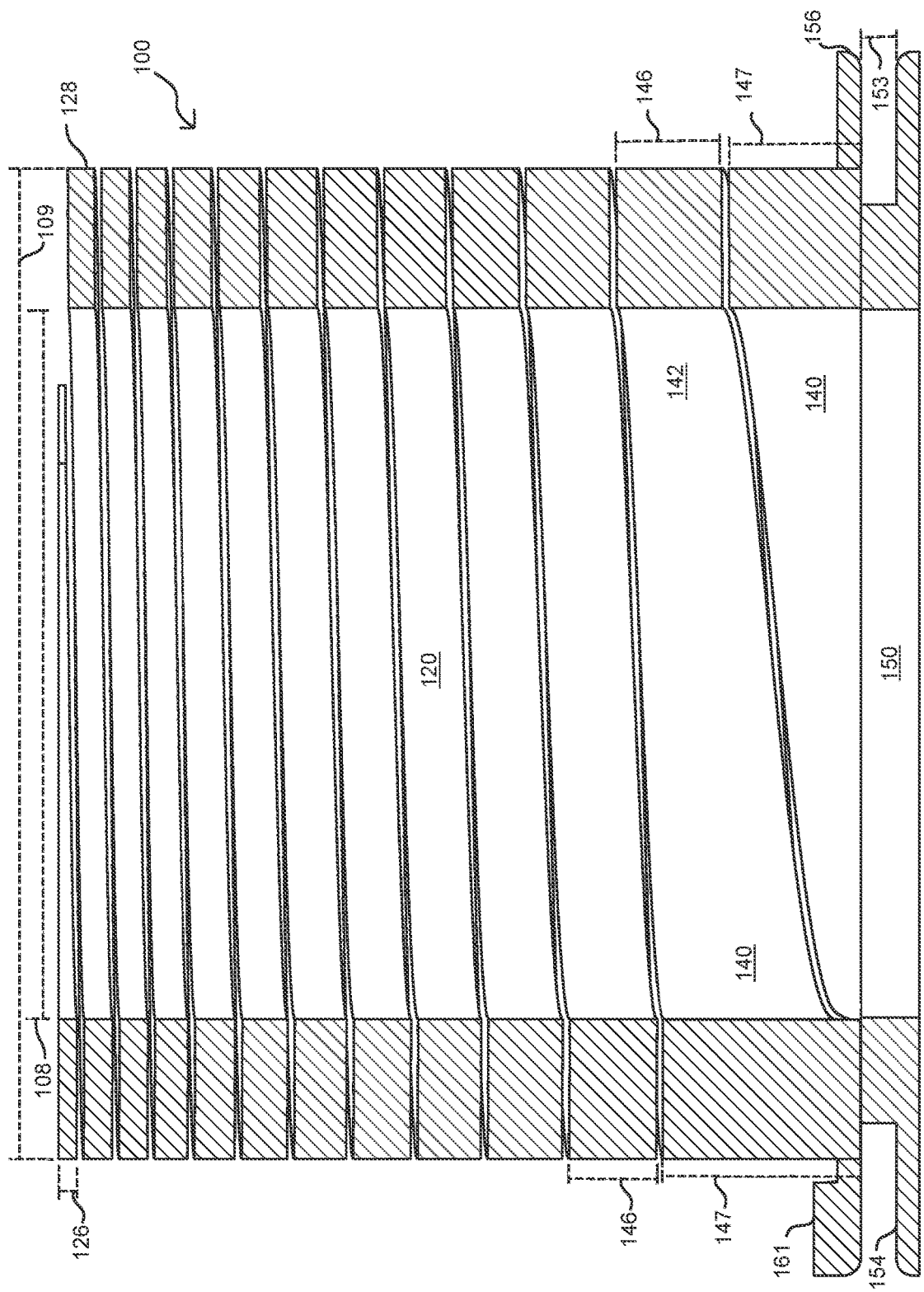
FIG. 25 is a cross-sectional side view showing measurements of the constricting coil friction clutch according to the present invention.

FIG. 25 is a cross-sectional view of the same embodiment shown in FIGS. 24 and 22 in order to show how these layers 120 taper smoothly and gradually. That is, in this embodiment, there are no "steps" between different layer widths, so as the coil winds helically around the center aperture, the width gradually increases.

Note also that while the overall pitch 130 will inevitably vary from coil layer 120 to coil layer due to these tapered widths, the actual width of the space between layers 132, 127, 145, 137 does not vary, e.g., about 0.25 mm. Thus the pitch varies from a first pitch to a last pitch according to the same ratio, e.g. 1:8 from first to last pitch 130. Again, it is to be understood that this pitch ratio could also include ranges of ratios between 1:1 to 1:30, more typically a range of 1:2 to 1:15, and more preferably, a range of 1:4 to 1:10.

Figure 29:
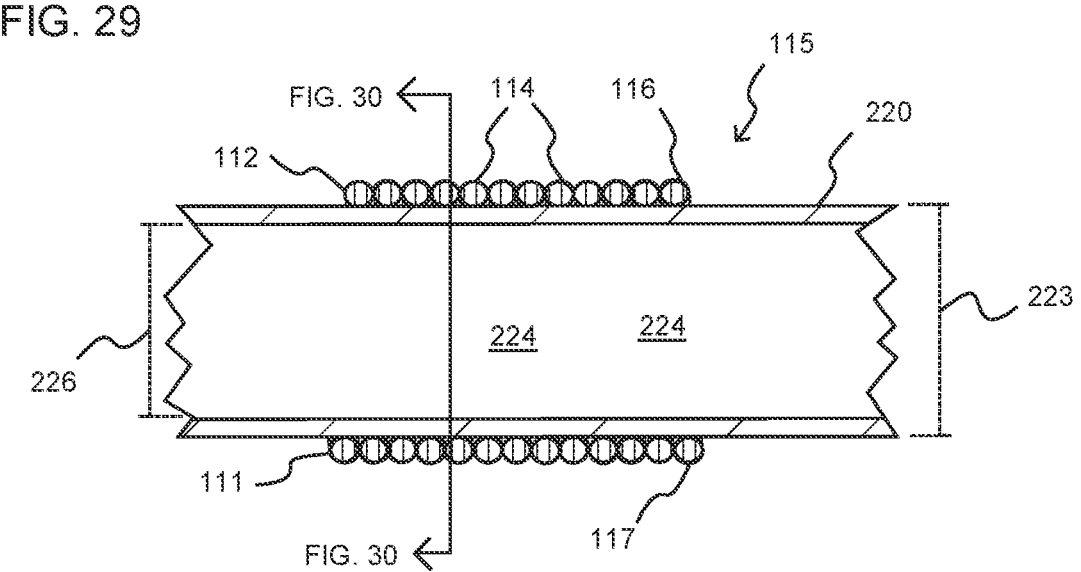
FIG. 29 is a side cross-sectional view showing measurements of one embodiment of the constricting coil friction clutch on a capstan shaft according to the present invention.
Figure 32:
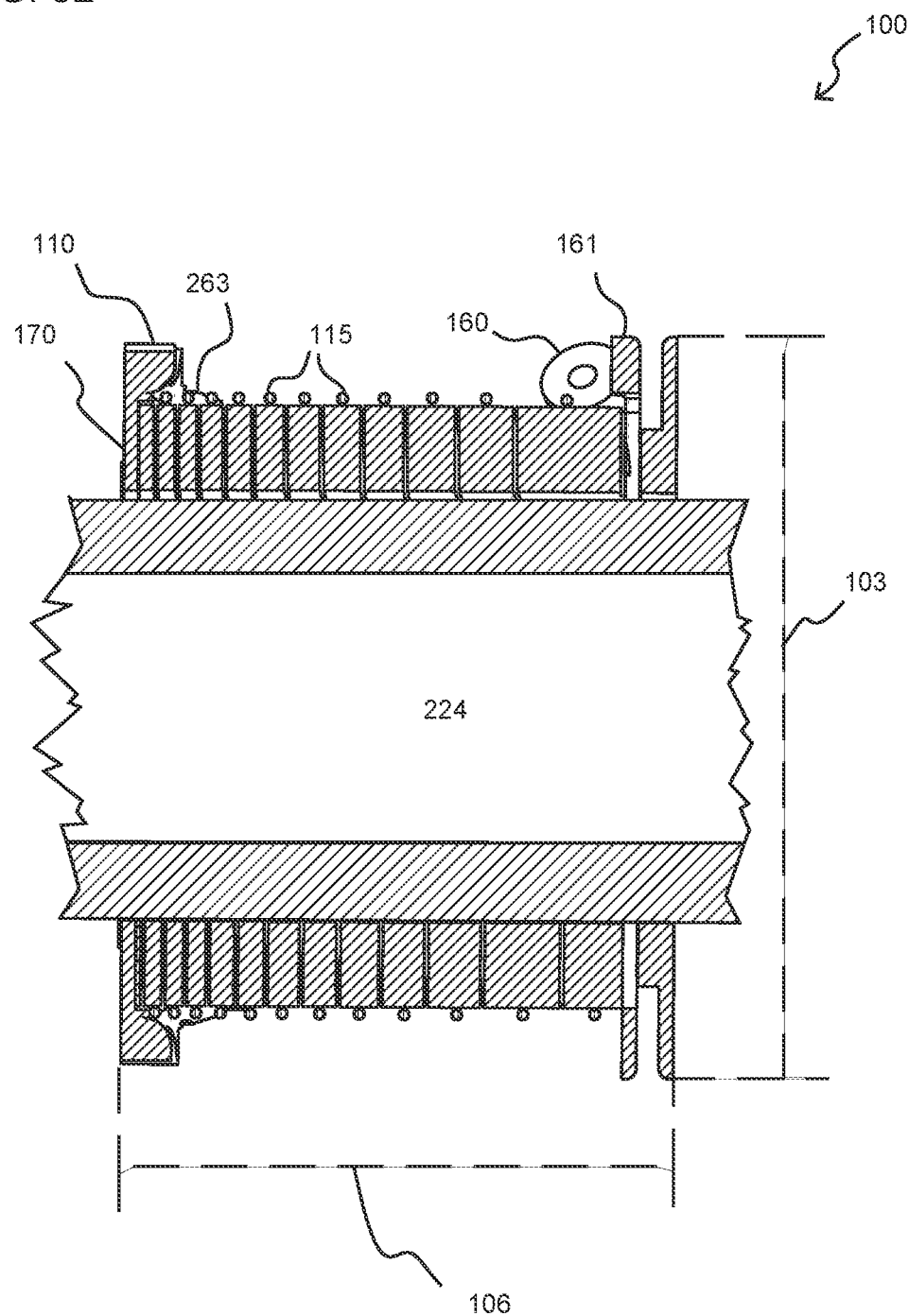
FIG. 32 is a side cross-sectional view showing measurements of one embodiment of the constricting coil friction clutch on a capstan shaft according to the present invention.

FIGS. 29 and 32 are provided to facilitate a discussion regarding the effect that the relative shape or contact profile of the inner surface of the constricting coil friction clutch 100 against the outer shape of the rotating power input tube (capstan tube) 220 has with respect to the amount of heat generated due to friction, and thus the effect on the useable lifespan of the system under normal wear conditions. FIG. 29 shows a typical non-optimal design.

FIGS. 29 and 32 illustrate different cross-section shapes of different material used in the coil 100. The inventor has discovered that wear becomes a serious problem if the total surface area of the constricting coil that contacts the rotating power input tube (capstan tube) is too small. Since this is a friction clutch based device, the heat generated per unit area of contact will be inversely proportional to the surface area of contact area times the velocity of the friction surfaces.

This means that the greater the surface area of contact the lower the heat at each point of contact will be, and since wear is directly proportional to the heat generated due to friction, wear characteristics are improved by making the inner surface of the coil wraps flat, in conformance with the outer shape of the rotating power input tube (capstan tube) and wide enough to have sufficient desired total surface area. The inventor has discovered that many materials are suitable, such as metal and nylon.

In the case of nylon, a thickness of about 12 mm was needed to be both strong enough and have good enough wear characteristics to be practical for a demonstration prototype. If a rigid or semi rigid coil is made of a material with a fixed width, with enough wraps to achieve the high gains that the invention achieves, the total length of the constricting coil friction clutch is very large and makes the coils unsuitable to be stacked or combined onto a power input tube (capstan tube) in a compact enough manner.

Figure 33:
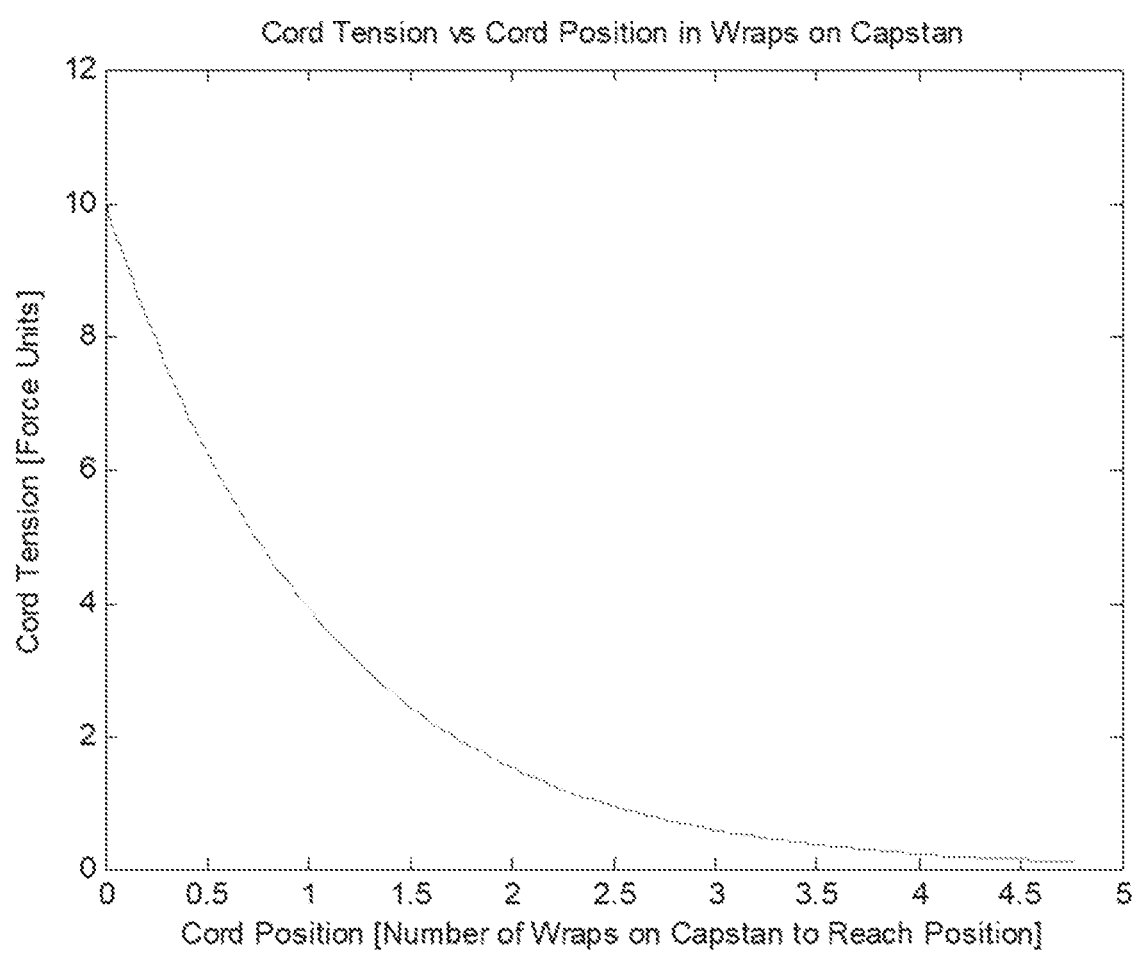
FIG. 33 is a graphical representation of cord tension vs. cord position.

FIG. 33 provides a graphical representation of cord tension vs. cord position based on the number of wraps on the rotating power input tube, in accordance with some embodiments.

A cord under tension may be wound around a rotating capstan. The tension in the cord presses it against the capstan surface, resulting in friction between the cord and capstan. This friction force acts to progressively reduce the tension in the cord along its path around the capstan.

Further, a small length of cord under tension force, T, wound on a capstan of radius, R may be considered. Because of the tension in the cord, it exerts a radial pressure, P, defined as the force per unit length of the cord acting radially on the capstan. From a free body diagram of the forces acting on a small length of cord, it can be determined that:

$P=T/R$

If $\mu$ is the coefficient of friction between the cord and the capstan, then the resulting friction force per unit length of the cord is:

$\mu * P = \mu * T/R$

This friction force acts to reduce the tension in the cord as it winds around the capstan.

Further, cord tension at a function of cord position may be calculated.

Let T(x) denote the cord tension as a function of cord position, x, and let T(0) denote the tension in the cord as it enters the capstan. Then to account for the reduction of tension along the cord, the following condition must be obeyed:

$$\frac{dT(x)}{dx} = -\frac{\mu}{R} * T(x)$$

The solution for T(x) in this differential equation is:

$$T(x) = e^{(-(u/R)x + \ln(T(0)))}$$

where T(0) is the tension being applied to the cord as it enters the capstan.

This expression for T(x) gives the tension force in the cord existing at any point, x, along the cord. This tension force ranges monotonically from its maximum value T(0) at the entry onto the capstan and converges to zero after many wraps.

Plots tension force in cord as it winds around a capstan.
u=coefficent of friction for cord on capstan surface.
R=Radius of capstan.
T0=Tension force as cord first contacts capstan.
x=Positions along the cord in length units.
T=exp(-(u/R)*x+log(T0)); Tension in cords at position x.
Wraps=x /(2*pi*R); Cord positions converted to number of wraps.

Conclusion

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An automatic machine comprising a torque distribution system; and at least a first moveable part associated with a first degree of freedom; the torque distribution system comprising:
   a large prime mover capable of providing rotating power;
   an input capstan tube being capable of being rotated by power provided by the prime mover;
   at least one coil friction clutch axially aligned with an axis of the input capstan tube;
   at least one small control servo capable of generating small forces for providing input to the at least one coil friction clutch;
   at least one mechanical transmission cable connected to the first moveable part associated with the first degree of freedom; and
   a support frame for securing the large prime mover, the input capstan tube, the at least one small control servo, and the at least one coil friction clutch within the automatic machine;
   wherein the at least one coil friction clutch activating movement of the first moveable part along the associated first degree of freedom.

2. The automatic machine comprising a torque distribution system of claim 1 wherein the at least one coil friction clutch is a constricting coil friction clutch.

3. The automatic machine comprising a torque distribution system of claim 2 wherein the at least one coil friction clutch comprises a series elastic actuator for output transmission of the constricting coil friction clutch.

4. The automatic machine comprising a torque distribution system of claim 1 wherein the at least one coil friction clutch is an expanding coil friction clutch.

5. The automatic machine comprising a torque distribution system of claim 1 wherein the at least one coil friction clutch being comprised of rigid materials arranged in any composite manner, the rigid materials selected from the group consisting of radial, axial, and blended material composition.

6. The automatic machine comprising a torque distribution system of claim 1 further comprising a second coil friction clutch; wherein the at least one friction clutch and the second coil friction clutch are arranged in a connected pair; and wherein the at least one friction clutch and the second coil friction clutch each separately control output transmission.

7. The automatic machine comprising a torque distribution system of claim 1 wherein the first moveable part associated with the first degree of freedom is a ball joint.

8. The automatic machine comprising a torque distribution system of claim 1, further comprising a software control system capable of controlling an input signal of the at least one coil friction clutch; and the software control system consisting of one of the group consisting of a proportional, integral, and derivative system.

9. The automatic machine comprising a torque distribution system of claim 1, wherein the large prime mover further consisting of one of the group of electric motors, hydraulic motors, gas piston motors, gas turbine motors, chemical motors, and compressed gas motors.

10. The automatic machine comprising a torque distribution system of claim 1, wherein the input capstan tube comprising material being one of the group consisting of metals, plastics, composites, stainless steel and titanium.

11. The automatic machine comprising a torque distribution system of claim 1, further comprising one of active and passive thermal cooling technology, wherein the active and passive liquid cooling technology being capable of effecting a thermal property of the input capstan tubes to reduce a heat due to friction along an interface between the at least one coil friction clutch and the input capstan tube.

12. A torque distribution system for automatic machines having first and second pluralities of moving parts respectively associated with respective first and second pluralities of degrees of freedom; the torque distribution system comprising:
   a large prime mover capable of providing rotating power;
   a first input capstan tube being rotated by the prime mover in a first direction;
   a second input capstan tube being rotated by the prime mover in a second direction opposite the first direction;
   a first plurality of coil friction clutches axially aligned with a first axis of the first input capstan tube;
   a second plurality of coil friction clutches axially aligned with a second axis of the second input capstan tube;
   a first plurality of control servos, each capable of generating small forces for providing input to a respective one of each of the first plurality of coil friction clutches;
   a second plurality of control servos, each respectively capable of generating small forces for providing input to a respective one of each of the second plurality of coil friction clutches;
   a first plurality of mechanical transmission cables, each respectively connected to a respective one of the first plurality of moving parts respectively associated with a respective one of the respective first plurality of degrees of freedom;
   a second plurality of mechanical transmission cables, each respectively connected to a respective one of the second plurality of moving parts respectively associated with a respective one of the respective second plurality of degree of freedom; and
   a support frame for securing the large prime mover, the first and second input capstan tubes, the first and second pluralities of coil friction clutches, and the first and second pluralities of control servos.

13. The torque distribution system for automatic machines of claim 12 wherein each of the first plurality of coil friction clutches and each of the second plurality of coil friction clutches are one of a constricting coil friction clutch and an expanding coil friction clutch.

14. The torque distribution system for automatic machines of claim 12 wherein each of the first plurality of coil friction clutches and each of the second plurality of coil friction clutches are comprised of rigid materials arranged in any composite manner, the rigid materials selected from the group consisting of radial, axial, and blended material composition.

15. The torque distribution system for automatic machines of claim 12 wherein each of the first plurality of coil friction clutches and each of the second plurality of coil friction clutches comprises a series elastic actuator for output transmission.

\* \* \* \* \*